US010193910B2

(12) United States Patent
Xue et al.

(10) Patent No.: US 10,193,910 B2
(45) Date of Patent: Jan. 29, 2019

(54) NETWORK ATTACK DETECTION METHOD

(71) Applicants: THE HONG KONG POLYTECHNIC UNIVERSITY, Hong Kong (CN); TENCENT TECHNOLOGY (SHENZHEN) COMPANY LIMITED, Shenzhen, Guangdong (CN)

(72) Inventors: Lei Xue, Shenzhen (CN); Zhiwei Liu, Shenzhen (CN); Xianneng Zou, Shenzhen (CN); Jingang Hou, Shenzhen (CN); Xiapu Luo, Shenzhen (CN); Edmond W. W. Chan, Shenzhen (CN); Pei Tu, Shenzhen (CN); Yuru Shao, Shenzhen (CN)

(73) Assignees: The Hong Kong Polytechnic University (CN); Tencent Technology (Shenzhen) Company Limited (CN)

( * ) Notice: Subject to any disclaimer, the term of this patent is extended or adjusted under 35 U.S.C. 154(b) by 0 days.

(21) Appl. No.: 15/836,540

(22) Filed: Dec. 8, 2017

(65) Prior Publication Data

US 2018/0103045 A1   Apr. 12, 2018

Related U.S. Application Data

(62) Division of application No. 14/688,554, filed on Apr. 16, 2015, now Pat. No. 9,876,807.

(30) Foreign Application Priority Data

Oct. 10, 2014  (CN) .......................... 2014 1 0532769

(51) Int. Cl.
*H04L 29/06*  (2006.01)
*H04L 12/24*  (2006.01)
*H04L 12/26*  (2006.01)

(52) U.S. Cl.
CPC .......... *H04L 63/1416* (2013.01); *H04L 41/12* (2013.01); *H04L 41/142* (2013.01);
(Continued)

(58) Field of Classification Search
CPC ....... H04L 41/12; H04L 41/142; H04L 43/10; H04L 43/0829; H04L 43/0864;
(Continued)

(56) References Cited

U.S. PATENT DOCUMENTS

2005/0165901 A1* 7/2005 Bu .......................... H04L 45/38
                                                                  709/217
2006/0182034 A1* 8/2006 Klinker .................. H04L 43/00
                                                                  370/238
(Continued)

FOREIGN PATENT DOCUMENTS

| CN | 101013976 A | 8/2007 |
| CN | 101572701   | 11/2009 |
| CN | 103957203   | 7/2014 |

OTHER PUBLICATIONS

Walters et al. (Walters, AAron, David Zage, and Cristina Nita-Rotaru. "Mitigating attacks against measurement-based adaptation mechanisms in unstructured multicast overlay networks." Network Protocols, 2006. ICNP'06. Proceedings of the 2006 14th IEEE International Conference on. IEEE, 2006).*
(Continued)

*Primary Examiner* — Yogesh Paliwal
(74) *Attorney, Agent, or Firm* — Baker & Hostetler LLP

(57) ABSTRACT

It is described a network attack detection method. A topology analysis on network is conducted to obtain a probing path set containing at least one probing path. A first probing path contained in the probing path set is probed by using a probing pattern to obtain a performance metric of the first probing path. It is determined whether the first probing path
(Continued)

is subjected to network attack according to the performance metric and a control performance metric.

7 Claims, 13 Drawing Sheets

(52) U.S. Cl.
CPC ............ *H04L 43/10* (2013.01); *H04L 43/087* (2013.01); *H04L 43/0829* (2013.01); *H04L 43/0864* (2013.01); *H04L 43/0894* (2013.01)

(58) Field of Classification Search
CPC ... H04L 43/087; H04L 43/0894; H04L 45/70; H04L 63/1416
USPC .......................................................... 726/23
See application file for complete search history.

(56) References Cited

U.S. PATENT DOCUMENTS

| | | | | |
|---|---|---|---|---|
| 2008/0080390 | A1* | 4/2008 | Ebuchi | ................ H04L 43/0829 370/253 |
| 2008/0253301 | A1* | 10/2008 | Keromytis | .......... H04L 41/0896 370/252 |
| 2012/0140647 | A1 | 6/2012 | Gao | |

OTHER PUBLICATIONS

M. Geva, A. Herzberg, and Y. Gev, "Bandwidth distributed denial of service: Attacks and defenses", IEEE Security and Privacy, Jan.-Feb. 2014.
Ahren Studer and Adrian Perrig, "The coremelt attack", Carnegie Mellon University, 2009.
S. Lee, M. Kang, and V. Gligor, "Codef: collaborative defense against large-scale link-flooding attacks", in Proc. ACM CoNEXT, 2013.
S. Lee and V. Gligor, "Floc: Dependable link access for legitimate traffic in flooding attacks", in Proc. IEEE ICDCS, 2010.
A. Athreya, X. Wang, Y. Kim, Y. Tian, and P. Tague, "Resistance is not futile: Detecting ddos attacks without packet inspection", Wireless Network and System Security Group, Carnegie Mellon University, USA, 2013.
Y. He, M. Faloutsos, S. Krishnamurthy, and B. Huffaker, "On routing asymmetry in the internet", in Proc. IEEE GLOBECOM, 2005.
B. Augustin, X. Cuvellier, B. Orgogozo, F. Viger, T. Friedman, M. Latapy, C. Magnien, and R. Teixeira, "Avoiding traceroute anomalies with Paris traceroute", in Proc. ACM IMC, 2006.
A. Khan, T. Kwon, H. Kim, and Y. Choi, "AS-level topology collection through looking glass servers", in Proc. ACM IMC, 2013.
N. Spring, R. Mahajan, and D. Wetherall, "Measuring ISP topologies with rocketfuel", in Proc. ACM SIGCOMM, 2002.
E. Chan, X. Luo, W. Li, W. Fok, and R. K. Chang, "Measurement of loss pairs in network paths", in Proc. ACM IMC, 2010.
X. Luo, E. Chan, and R. Chang, "Design and implementation of TCP data probes for reliable and metric-rich network path monitoring", in Proc. USENIX ATC, 2009.
E. Chan, A. Chen, X. Luo, R. Mok, W. Li, and R. Chang, "TRIO: Measuring asymmetric capacity with three minimum round-trip times", in Proc. ACM CoNEXT, 2011.
N. Hu, L. Li, Z. M. Mao, P. Steenkiste, and J. Wang, "Locating internet bottlenecks: Algorithms, measurements, and implications", in Proc. ACM SIGCOMM, 2004.
R. Koodli and R. Ravikanth, "One-way loss pattern sample metrics", RFC 3357, Aug. 2002.
J. Sommers, P. Barford, and W. Willinger, "Laboratory-based calibration of available bandwidth estimation tools", Microprocess. Microsyst., vol. 31, No. 4, pp. 222-235, 2007.
M. Allman, V. Paxson, and E. Blanton, "Rfc5681: Tcp congestion control," 2009.
Z. Durumeric, E. Wustrow, and J. Halderman, "Zmap: Fast internet-wide scanning and its security applications", in Proc. 22nd USENIX Security Symposium, 2013, pp. 605-619.
M. Tozal and K. Sarac, "Tracenet: An internet topology data collector", in Proc. ACM IMC, 2010.
J. Li, T. Ehrenkranz, and P. Elliott, "Buddyguard: A buddy system for fast and reliable detection of ip prefix anomalies", in Proc. IEEE ICNP, 2012.
E. Katz-Bassett, H. Madhyastha, V. Adhikari, C. Scott, J. Sherry, P. Wesep, A. Krishnamurthy, and T. Anderson, "Reverse traceroute", in Proc. USENIX NSDI, 2010.
J. Padhye and S. Floyd, "Identifying the TCP behavior of web servers", in Proc. ACM SIGCOMM, 2001.
A. Dainotti, A. Botta, and A. Pescape, "A tool for the generation of realistic network workload for emerging networking scenarios", Computer Networks, vol. 56, No. 15, 2012.
M. Thottan and C. Ji, "Anomaly detection in ip networks", IEEE Trans. on Signal Processing, vol. 51, No. 8, 2003.
T. Peng, C. Leckie, and K. Ramamohanarao, "Survey of network-based defense mechanisms countering the dos and ddos problems," ACM Computing Surveys (CSUR), vol. 39, No. 1, 2007.
G. Loukas and G. Öke, "Protection against denial of service attacks: a survey", The Computer Journal, vol. 53, No. 7, 2010.
S. T. Zargar, J. Joshi, and T. D., "A survey of defense mechanisms against distributed denial of service (DDoS) flooding attacks," IEEE Communications Surveys & Tutorials, vol. 15, No. 4, 2013.
M. Bhuyan, H. Kashyap, D. Bhattacharyya, and J. Kalita, "Detecting distributed denial of service attacks: Methods, tools and future directions", The Computer Journal, Mar. 2013.
M. Bhuyan, D. Bhattacharyya, and J. Kalita, "Network anomaly detection: Methods, systems and tools", Communications Surveys & Tutorials, 2013.
L. Quan, J. Heidemann, and Y. Pradkin, "Trinocular: Understanding internet reliability through adaptive probing", in Proc. ACM SIGCOMM, 2013.
Y. Zhang, Z. Mao, and M. Zhang, "Detecting traffic differentiation in backbone ISPs with NetPolice", in Proc. ACM IMC, 2009.
E. Katz-Bassett, H. Madhyastha, J. John, A. Krishnamurthy, D. Wetherall, and T. Anderson, "Studying black holes in the internet with hubble," in Proc. USENIX NSDI, 2008.
Y. Liu, X. Luo, R. Chang, and J. Su, "Characterizing Inter-Domain Rerouting by Betweenness Centrality after Disruptive Events", IEEE Journal on Selected Areas in Communications, vol. 31, No. 5, 2013.
E. Chan, X. Luo, W. Fok, W. Li, and R. Chang, "Non-cooperative diagnosis of submarine cable faults", in Proc. PAM, 2011.
Y. Zhang, Z. Mao, and M. Zhang, "Effective diagnosis of routing disruptions from end systems", in proc. USENIX NSDI, 2008.
A. Shevtekar and N. Ansari, "A router-based technique to mitigate reduction of quality (roq) attacks", Computer Networks, vol. 52, No. 5, 2008.
C. Zhang, Z. Cai, W. Chen, X. Luo, and J. Yin, "Flow level detection and filtering of low-rate DDoS", Computer Networks, vol. 56, No. 15, 2012.
R. Castro, M. Coates, G. Liang, R. Nowak, and B. Yu, "Network tomography: recent developments", Statistical Science vol. 19, No. 3, 2004.
C. Chang, S. Lee, B. Lin, and J. Wang, "The taming of the shrew: mitigating low-rate tcp-targeted attack", IEEE Trans. on Network Service Management, Mar. 2010.
A. Dhamdhere, R. Teixeira, C. Dovrolis, and C. Diot, "NetDiagnoser: troubleshooting network unreachabilities using end-to-end probes and routing data", in Proc. ACM CoNEXT, 2007.
S. Zarifzadeh, M. Gowdagere, and C. Dovrolis, "Range tomography: combining the practicality of boolean tomography with the resolution of analog tomography", in Proc. ACM IMC, 2012.
N. Duffield, P. Avenue, and F. Park, "Network tomography of binary network performance characteristics", IEEE Trans. Information Theory, vol. 52, No. 12, 2006.

(56) References Cited

OTHER PUBLICATIONS

Q. Zheng and G. Cao, "Minimizing probing cost and achieving identifiability in probe based network link monitoring", IEEE Trans. Computers, vol. 62, No. 3, 2013.

Y. Zhao, Y. Chen, and D. Bindel, "Towards unbiased end-to-end network diagnosis", IEEE/ACM Transaction on Networking, vol. 17, No. 6, 2009.

Y. Lin, R. Hwang, and F. Baker, Computer Networks: An Open Source Approach. McGraw-Hill, 2011.

W. Fok, X. Luo, R. Mok, W. Li, Y. Liu, E. Chan, and R. Chang, "Monoscope: Automating network faults diagnosis based on active measurements", in Proc. IFIP/IEEE IM, 2013.

H. Nguyen and P. Thiran, "The boolean solution to the congested IP link location problem: theory and practice," in Proc. IEEE INFOCOM, 2007.

M. Crovella and B. Krishnamurthy, Internet Measurement: Infrastructure, Traffic and Applications. Wiley, 2006.

Y. Xiang, K. Li, and W. Zhou, "Low-rate ddos attacks detection and traceback by using new information metrics," IEEE Trans. on Information Forensics and Security, vol. 6, No. 2, 2011.

Lei, Xue ect., Towards Detecting Target Link Flooding Attack, ACM, mailed on Oct. 9, 2014.

L. Ma, T. He, K. K. Leung, A. Swami, and D. Towsley, "Identifiability of link metrics based on end-to-end path measurements," in Proc. ACM IMC, 2013.

M. Kang, S. Lee, and V. Gligor, "The crossfire attack," in Proc. IEEE Symp. on Security and Privacy, 2013.

Notification of the First Office Action of Chinese application No. 201410532769.8, dated Apr. 21, 2017.

Incapsula, "2013-2014 DDoS threat landscape report," 2014.

\* cited by examiner (a) Pulsing LFA.

(b) LFA with variant attack traffic rates.

(c) Gradual LFA.

(d) Random packet drop.

(a) RTT and RTT jitter.

(b) Packet loss rate.

(c) Packet reordering rate.

(d) $\theta_e$.

(a) RTT and RTT jitter.

(b) Packet loss rate.

(c) Packet reordering rate.

(d) $\theta_e$.

NETWORK ATTACK DETECTION METHOD

CROSS-REFERENCE TO RELATED APPLICATIONS

This is a divisional application of U.S. patent application Ser. No. 14/688,554, which claims the priority of the Chinese Patent Application No. 201410532769.8, entitled "Network Attack Detection Method and Device," filed on Oct. 10, 2014, the related applications are hereby incorporated by reference herein in their entirety.

TECHNICAL FIELD

In various embodiments, the present disclosure relates to the field of attack detection in the network, and in particular to a network attack detection method.

BACKGROUND

Recent research discovered a new class of Target Link Flooding Attack (LFA) in the DDoS (Distributed Denial of Service) that can effectively cut off the Internet connections of a target area (or guard area) without being detected. More precisely, an attacker first selects persistent links that connect the target area to the Internet and have high flow density, and then instructs bots to generate legitimate traffic between themselves and public servers for congesting those links. If the paths among bots cover the target area, an attacker can also send traffic among themselves to clog the network.

It is difficult to detect LFA because (1) the target links are selected by an attacker. Since the target links may be located in an AS different from that containing the target area and the attack traffic will not reach the target area, the victim may not even know he/she is under attack; (2) each bot sends low-rate protocol-conforming traffic to public servers, thus rendering signature-based detection systems useless; (3) bots can change their traffic patterns to evade the detection based on abnormal traffic patterns. Although a few router-based approaches have been proposed to defend against such attacks, their effectiveness may be limited because they cannot be widely deployed to the Internet immediately.

SUMMARY

According to an aspect of the present disclosure, it is provided a network attack detection method. A topology analysis is conducted on network such that a probing path set containing at least one probing path is obtained. A first probing path contained in the probing path set is probed by using a probing pattern such that a performance metric of the first probing path is obtained. It is determined whether the first probing path is subjected to network attack according to the performance metric and a control performance metric.

In some examples, the probing pattern may be modified Recursive Packet Train (mRPT), the performance metric of the first probing path may comprise available bandwidth on the forward path.

In some examples, the operation of probing a first probing path by using a probing pattern to obtain a performance metric of the first probing path may include:

sending a mRPT probing packet train from the probing node to the target node, wherein the mRPT probing packet train contains a first sub-probing packet, $N_L$ load packets and a second sub-probing packet in sequence, wherein $N_L$ is an integer equal to or greater than 1;

receiving a first ACK packet in responsive to the first sub-probing packet and a second ACK packet in responsive to the second sub-probing packet from the target node;

determining a time gap $G_A$ between an arrival time of the first ACK packet and an arrival time of the second ACK packet; and calculating the available bandwidth on the forward path according to $N_L$, $G_A$ and $S_L$, where $S_L$ is the size of a load packet.

In some examples, the method may further include: in the case it is determined the first probing path is subjected to the network attack, determining hop-by-hop a target link which is under the network attack on the first probing path.

In some examples, the mRPT probing packet train may further contain a first measurement packet train before the first sub-probing packet which includes h measurement packets numbering 1 to h respectively. A Time to Live (TTL) of the measurement packet in the first measurement packet train is equal to its numbering, and h is the amount of hops on the first probing path.

In some examples, the operation of the determining hop-by-hop a target link which is under the network attack on the first probing path may include:

receiving a first time exceeded ICMP packet upon the TTL of a measurement packet in the first measurement packet train is equal to 0;

determining a part of the first probing path which covers the target link under the network attack, according to the received first time exceeded ICMP packet; and locating the target link under the network attack according to a probing result from a second probing path contained in the probing path set which covers the target link under the network attack.

In some examples, the mRPT probing packet train may further contain a second measurement packet train after the second sub-probing packet which includes h measurement packets numbering h to 1 respectively. The TTL of the measurement packet in the second measurement packet train is equal to its numbering.

In some examples, the operation of the determining hop-by-hop a target link which is under the network attack on the first probing path comprises:

receiving a second time exceeded ICMP packet upon the TTL of a measurement packet in the second measurement packet train is equal to 0;

determining a time gap $G_{I(i)}$ between the arrival time of the first time exceeded ICMP packet and the arrival time of the second time exceeded ICMP packet from the $i^{th}$ hop;

determining $i^{th}$ hop available bandwidth, according to a total size of $N_L$ load packets and the two sub-probing packets, a total size of measurement packets numbering h-i to h, and the time gap $G_{I(i)}$; and locating the target link under the network attack according to the $i^{th}$ hop available bandwidth.

According to another aspect of the present disclosure, it is provided a non-transitory computer-readable storage medium storing instructions thereon for execution by for example at least one processing circuit, the instructions include: conducting a topology analysis on network to obtain a probing path set containing at least one probing path; probing a first probing path contained in the probing path set by using a probing pattern to obtain a performance metric of the first probing path; and determining whether the to first probing path is subjected to network attack according to the obtained performance metric and a control performance metric.

According to still another aspect of the present disclosure, it is provided a network attack detection apparatus. The apparatus includes: one or more processors; and a memory coupled to the one or more processors; instructions stored in the memory, the instructions being executable by the one or more processors to: conduct a topology analysis on network, and obtain a probing path set containing at least one probing path according to the topology analysis; probe a first probing path contained in the probing path set by using a probing pattern and obtain a performance metric of the first probing path; and determine whether the first probing path is subjected to network attack according to the performance metric and a control performance metric.

This section provides a general summary of the disclosure, and is not a comprehensive disclosure of its full scope or all of its features. Further areas of applicability will become apparent from the description provided herein. The description and specific examples in this summary are intended for purposes of illustration only and are not intended to limit the scope of the present disclosure.

BRIEF DESCRIPTION OF THE DRAWINGS

In the following, embodiments of the present disclosure will be discussed with reference to drawings. It should be understood that the drawings illustrate generally, by way of example, but not by way of limitation, various embodiments discussed in the present disclosure.

DETAILED DESCRIPTION

Figure 1:
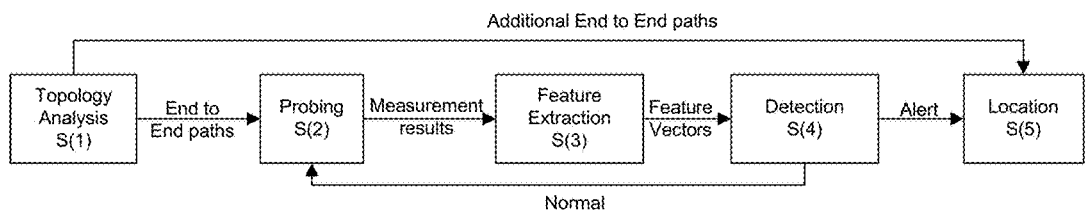
FIG. 1 illustrates major steps for detecting LFA and locating target links/areas according to an embodiment of the present disclosure.

It is desirable to have a practical system that can help victims detect LFA and locate the links under attack if possible so that victims may adopt other techniques or ask help from upstream providers to mitigate the effect of LFA. In some embodiments, the present disclosure fills this gap by proposing and implementing a system (named for example PathScope hereinafter), which employs both end-to-end and hop-by-hop network measurement techniques to achieve this goal. The design of PathScope exploits the nature of LFA including:

(1) it causes severe congestions on important links. Note that light congestion cannot disconnect the target area from the Internet.

For example, a campus network A is connected with an external network through three links: a link A which bears 80% of the data traffic of the campus network A in normal condition, a link B which bears 15% of the data traffic of the campus network A in normal condition, and a link C which bears 5% of the data traffic of the campus network A in normal condition. If the link C is congested due to the LFA, then little influence will impose on the normal running of the campus network, and thus most of clients in the campus network can still enjoy network services;

(2) although the congestion duration will be much shorter than that caused by traditional bandwidth DDoS, the congestion period caused by LFA should not be too short. Otherwise, it cannot cause significant damage to the victim;

(3) to cut off the Internet connections of a target area, LFA has to continuously clog important links. Otherwise, the victim can still access the Internet.

PathScope in embodiments of the present disclosure can actively collect samples of network path performance metrics and use abnormal performance degradation to detect LFA.

The present disclosure can tackle a number of challenging issues to realize a practical detection system, including:

1) Since the target links are selected by an attacker, a user has to monitor as many paths as possible. However, the majority of existing network measurement systems have limited scalability because they require installing measurement tools on both ends of each path. The present disclosure can solve this issue from two aspects. First, PathScope is designed as a non-cooperative measurement tool that only needs the installation on one end of a path. Therefore, it can cover much more paths than existing systems. Second, the present disclosure strategically selects important paths for measurement.

2) Due to the prevalence of asymmetric routes, PathScope is equipped with the capability to differentiate the performance metrics on the forward path (i.e., from the host where PathScope is running to a remote host) and that on the reverse path. It empowers a user to infer which path(s) is under attack.

3) Although network failures may also lead to abnormal path metrics, they will not result in the same effect on all path metrics as that caused by LFA. For example, LFA will cause temporal instead of persistent congestions. By learning the normal profiles of a set of path metrics, PathScope can detect LFA, differentiate it from network failures, and identify different attack patterns.

4) By conducting hop-by-hop measurement, PathScope locates the target link or to the target area on the forward path.

FIG. 1 illustrates the major steps in the methodology for detecting LFA and locating target links/areas whenever possible. The first step S(1) involves identifying potential target links and enumerating a set of end-to-end paths that cover potential target links. It is conducted the non-cooperative measurement on selected paths and step S(2) describes the measurement method and the corresponding performance metrics. steps S(3) and S(4) elaborate the feature extraction algorithm turns raw measurement results into feature vectors, which will be fed into the detection module for determining the existence of LFA. If there is no attack, the system will continue the measurement. Otherwise, the localization mechanism (step S(5)), will be activated for inferring the links or areas under attack.

S(1). Topology Analysis

Adopting the non-cooperative measurement approach, PathScope only needs to be installed on one end of an Internet path, which is named as a prober (probing node). The current implementation of PathScope can use almost any web server as the other end, because there are tremendous web servers.

Figure 2A:
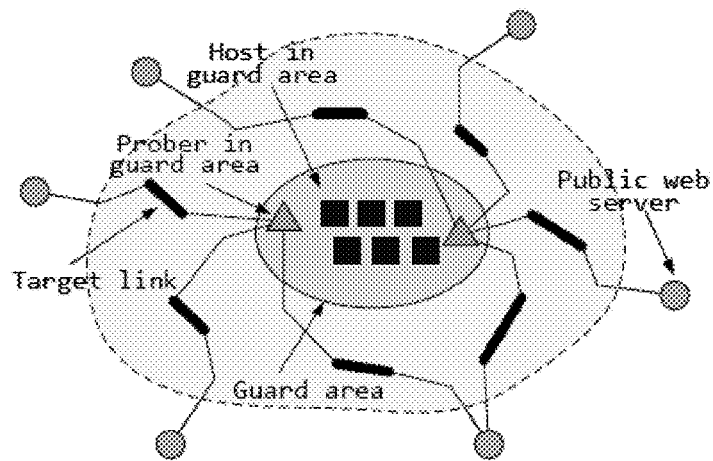
FIG. 2A illustrates a deployment strategy of PathScope (i.e., self-initiated measurement) according to an embodiment of the present disclosure.
Figure 2B:
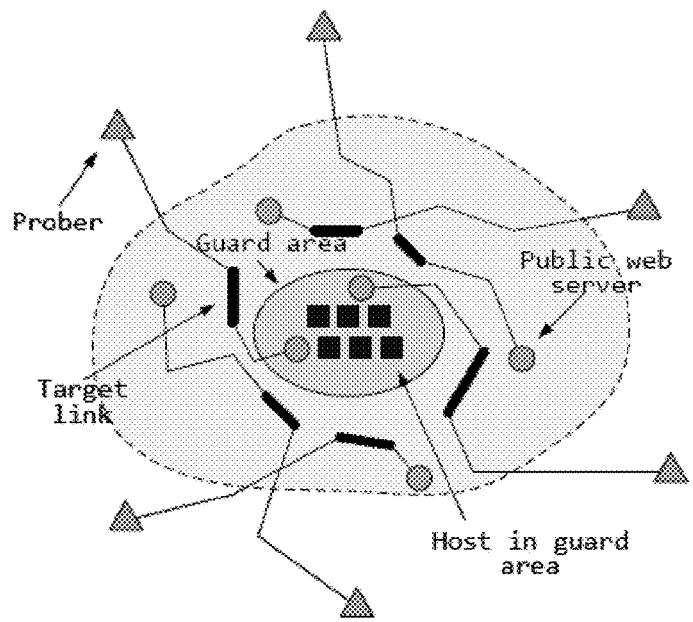
FIG. 2B illustrates another deployment strategy of PathScope (i.e., cloud-based measurement) according to an embodiment of the present disclosure.

There are two common strategies to deploy PathScope. FIG. 2A shows the first one, named self-initiated measurement, where PathScope runs on hosts within the guard area. By selecting Web servers in different autonomous systems (AS), a user can measure many diverse Internet paths for covering all possible target links. The second scenario, as illustrated in FIG. 2A, is the cloud-based measurement where PathScope runs on a group of hosts outside the guard area (e.g., virtual machines (VM) in different data centers, etc.) and measures the paths between themselves and hosts close to the guard area or even hosts within the guard area. Although the latter case is similar to the scenario of utilizing cooperative measurement systems that require the control of both ends of a path, using PathScope can simplify the deployment because only one end needs to install PathScope. By running PathScope on hosts in diverse networks and/or selecting web servers in various locations, the paths under measurement may include all possible target links.

Given a guard area, it is first constructed the network topology between it and its upstream ASes by performing paris-traceroute from a group of hosts (e.g., VM in clouds or looking glasses) to web servers close to or within the guard area, or using systems like Rockeffuel. From the topology, potential target can be identified following the LFAs strategy that selects persistent links with high flow density. The flow density of a link is defined as the number of Internet paths between bots and public servers in the target area, which include that link.

Given a set of potential target links denoted as $L=\{l_1, l_2, \ldots, l_M\}$, it is selected a set of paths for measurement, which is indicated by $P=\{p_1, p_2, \ldots, p_N\}$. Since there may be more than one path traversing certain target links, three rules are defined to guide the path selection in some embodiments of the present disclosure:

1) For the ease of locating target links, paths that contain one target link will be selected.

2) The number of paths sharing the same remote host should be minimized to avoid mutual interference. It is desirable that each path has different remote host.

3) Similar to the second rule, the number of paths initialized by one prober should be minimized to avoid self-induced congestion.

S(2). Measurement Approaches

As LFA will congest the selected links, it will lead to anomalies in one or more of the following path performance metrics, including:

1) Packet loss, which will increase because the link is clogged;

2) Round-trip time (RTT), which may also increase because of the full queue in routers under attack;

3) Jitter, which may have large variations when bots send intermittent bursts of packets to congest the link, thus leading to variations in the queue length;

4) Number of loss pair, which may increase as a pair of probing packets may often see full queue due to LFA;

5) Available bandwidth, which will decrease because the target link is congested;

6) Packet reordering, which may increase if the router under attack transmits packets through different routes;

7) Connection failure rate, which may increase if the target area has been isolated from the Internet due to severe and continuous LFA.

Besides measuring the above metrics, PathScope also supports the following features in embodiments of the present disclosure:

1) Conduct the measurements within a legitimate TCP connection to avoid the biases or noises due to network elements that process TCP/UDP packets in a different manner and discard all but TCP packets belonging to valid TCP connections;

2) Perform both end-to-end and hop-by-hop measurements. The former can quickly detect the anomalies caused by LFA while the latter helps localize the target links.

3) Support the measurement of one-way path metrics because of the prevalence of asymmetric routing.

To fulfill these requirements, PathScope in some embodiments adopts and modifies three probing patterns and integrates them into a coherent system.

Figure 3:
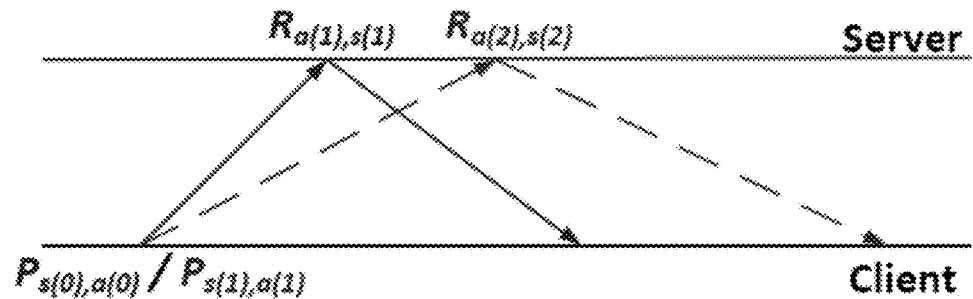
FIG. 3 illustrates Round Trip Probing (RTP) pattern according to an embodiment of the present disclosure.

1) Round Trip Probing (RTP): it is proposed the RTP probing pattern to measure RTT, one-way packet loss, and one-way packet reordering. As shown in FIG. 3, each RTP measurement involves sending two back-to-back probing packets (i.e., $P_{s(0),a(0)}$ and $P_{s(1),a(1)}$) with customized TCP sequence number (i.e., s(0),s(1)), acknowledgement number (i.e., a(0) and a(1)), and advertising window (i.e., 2 maximal segment size), to the remote host, each of which will elicit one response packet (i.e., $R_{a(1),s(1)}$ and $R_{a(2),s(2)}$). By analyzing the sequence numbers and the acknowledgement numbers in the response packets, it is able to decide whether there is packet loss/packet reordering occurred on the forward path (i.e, from the host where PathScope is running to a remote host) or the reverse path (i.e., from the remote host to the prober). In some examples, if the server supports TCP options like timestamp or SACK, they can ease the detection of forward path packet loss. Moreover, RTT can be measured as the duration from sending $P_{s(0),a(0)}$ to receiving $R_{a(1),s(1)}$.

Figure 4:
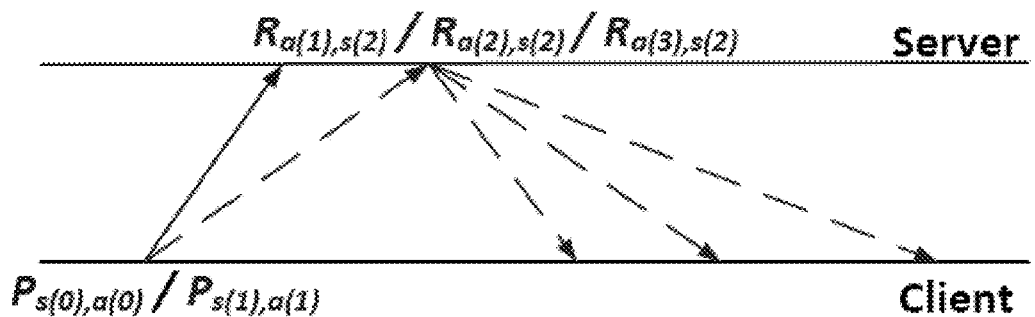
FIG. 4 illustrates modified Two Way Probing (TWP) pattern according to an embodiment of the present disclosure.

2) Two Way Probing (TWP): it is proposed the TWP probing pattern for measuring one-way capacity. As shown in FIG. 4, TWP involves sending two back-to-back probing packets (i.e., $P_{s(0),a(0)}$ and $P_{s(1),a(1)}$). The first packet in TWP uses zero advertising window so that the server sends nothing on the arrival of $P_{s(0),a(0)}$. In the original TWP, the advertising window in $P_{s(1),a(1)}$ is equal to 2 maximal segment size (MSS) so that it will trigger two packets from the server. Since a packet train can characterize more loss patterns than a packet pair, in some examples the inventors enlarge the advertising window in $P_{s(1),a(1)}$ from 2 to w (w≥2). As the server may dispatch w packets back-to-back if its congestion window allows, the time gap between the first and the $w^{th}$ packet, denoted as $G_r$, can be computed, and then the available bandwidth on the reverse path, indicated as $\theta_r$, can be inferred as follows:

$$\theta_r = \frac{MSS \times w}{G_r} \quad (1)$$

Figure 5:
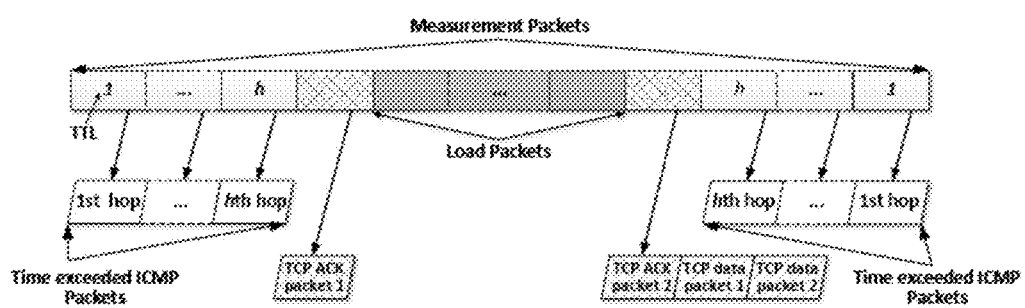
FIG. 5 illustrates modified Recursive Packet Train (RPT) pattern according to an embodiment of the present disclosure.

3) Recursive Packet Train (RPT): RPT was employed in Pathneck for detecting the location of a network path's bottleneck. The original RPT consists of a group of load packets and a set of TTL-limited measurement packets and Pathneck uses UDP packets to construct RPT. In embodiments of the present disclosure, the inventors modify RPT to support end-to-end and hop-by-hop measurement in a TCP connection and remove redundant packets. FIG. 5 illustrates the modified RPT, denoted as mRPT, where each rectangle is a probing packet and each parallelogram indicates a response packet triggered by a probing packet. mRPT has h pairs of small measurement packets, whose TTL values are equal to the number in those rectangles. Since a router will send back a time exceeded ICMP packet when a packet's TTL becomes zero, a pair of ICMP (Internet Control Message Protocol) packets will be sent back after mRPT passes through a router. $G_{I(i)}$ is used to denote the time gap between the two ICMP packets from the $i^{th}$ hop. PathScope in some embodiments of the present disclosure does not use a fixed number of measurement packets (e.g., 30) because the embodiments do not want them reach the server and LFA usually targets on links outside the victim's network. Instead, PathScope first determines h by doing a traceroute.

The load packets in the embodiments of the present disclosure are customized TCP packets that belong to an established TCP connection and carry invalid checksum value or TCP sequence number so that they will be discarded by the server. There are two special packets (i.e., R1 and R2) between the load packets and the measurement packets. They have the same size as the load packets and work together to accomplish two tasks: (1) each packet triggers the server to send back a TCP ACK packet so that the prober can use the time gap between these two ACK packets, denoted as $G_A$, to estimate the interval between the head and tail load packet; (2) induce two TCP data packets from the server to start the measurement through RTP. To achieve these goals, PathScope prepares a long HTTP request whose length is equal to two load packets and puts half of it to R1 and the remaining part to R2. To force the server to immediately send back an ACK packet on the arrival of R1 and R2, R2 is firstly send and then R1, because a TCP server will send back an ACK packet when it receives an out-of-order TCP segment or a segment that fills a gap in the sequence space.

To characterize the per-hop available bandwidth and end-to-end available bandwidth, PathScope defines $\theta_i$ (i=1, . . . , h) and $\theta_e$ as follows:

$$\theta_i = \frac{S_L \times (N_L + 2) + S_M \times (h - i)}{G_{I(i)}}, i = 1, \ldots, h \quad (2)$$

$$\theta_e = \frac{S_L \times N_L}{G_A}, \quad (3)$$

where $S_L$ and $S_M$ denote the size of a load packet and that of a measurement packet, respectively. $N_L$ is the number of load packets. Since the packet train structure cannot be controlled after each hop, $\theta_i$ (or $\theta_e$) is not a very accurate estimate of per-hop available bandwidth (or end-to-end available bandwidth). However, since LFA will lead to severe congestion on selected links, $\theta_i$ of the target link or $\theta_e$ on the path covering the target link will be throttled. In other words, the abnormal decrease in a and $\theta_e$ is an indicator of LFA.

Figure 6A:
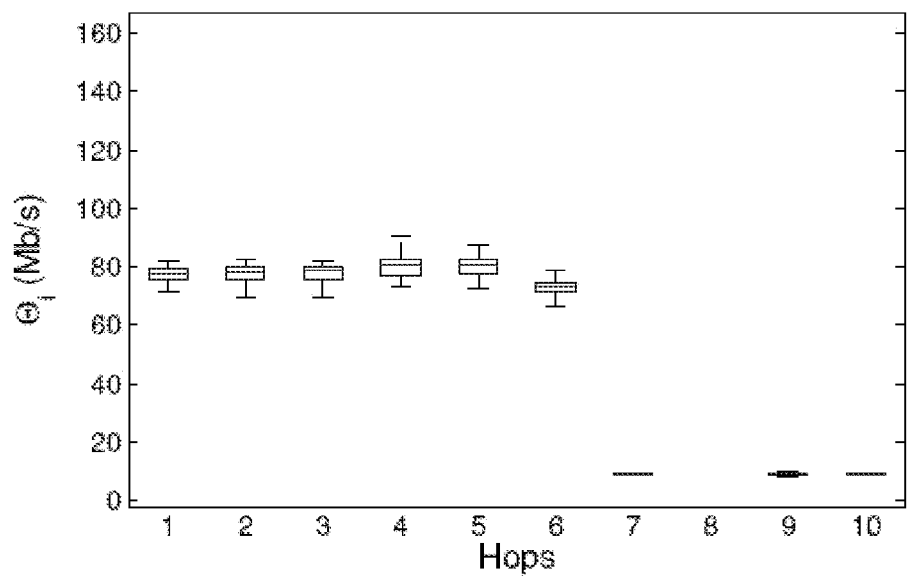
FIG. 6A illustrates $\theta_l$ measured on a path from Korea to Hong Kong according to an embodiment of the present disclosure.
Figure 6B:
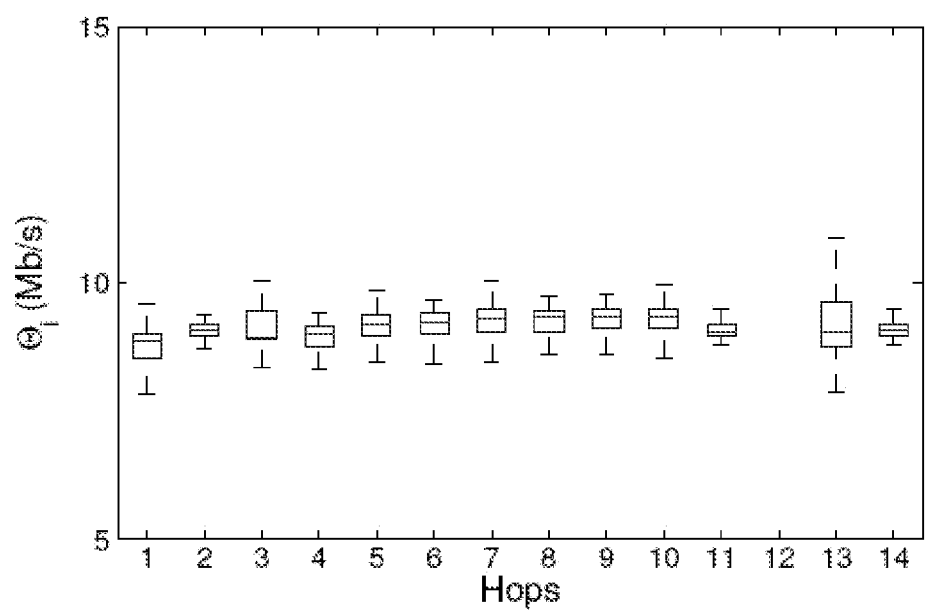
FIG. 6B illustrates $\theta_l$ measured on a path from Taiwan to Hong Kong according to an embodiment of the present disclosure.

FIG. 6 shows $\theta_i$ on two paths to a web server in PolyU, of which the last four hops are to located in the campus network. Since the last but two hops did not send back ICMP packets, there is no $\theta_i$ on that hop. One path is from Korea to Hong Kong, $\theta_i$ drops from around 80 Mbps to around 9 Mbps on the 7th hop. It is because the bandwidth of each host in campus network is limited to 10 Mbps. One path is from Taiwan to Hong Kong, $\theta_i$ is always around 9 Mbps. It may be due to the fact the first hop's available bandwidth is around 9 Mbps.

S(3)-S(4). Anomaly Detection

It is defined two metric vectors in Eq. (4) and Eq. (5), which cover selected performance metrics, for the forward path and the reverse path, respectively. Table 1 lists the meaning of each performance metric.

$$\overrightarrow{F_{forward}} = \{\theta_e, R_{RFPL}, R_{TFPL}, R_{RFPL2}, R_{TFPL2}, R_{RFPR}, \quad (4)$$
$$R_{TFPR} RTT, J_{RTT}, Fail_{RTP}, Fail_{TWP}\}^T$$

$$\overrightarrow{F_{reverse}} = \{\theta_r, R_{RRPL}, R_{TRPL}, R_{RRPL2}, R_{TRPL2}, R_{RRPR}, \quad (5)$$
$$R_{TRPR} RTT, J_{RTT}, Fail_{RTP}, Fail_{TWP}\}^T$$

TABLE 1

Detail packet loss metrics measured during one probe

| Direction | Metric | Defination |
|---|---|---|
| Forward | $\theta_e$ | Estimated available bandwidth from RPT. |
|  | $R_{RFPL}$ | Packet loss rate from RTP. |
|  | $R_{TFPL}$ | Packet loss rate from TWP. |
|  | $R_{RFPL2}$ | Loss pair rate from RTP. |
|  | $R_{TFPL2}$ | Loss pair rate from TWP. |
|  | $R_{RFPR}$ | Packet reordering rate from RTP. |
|  | $R_{TFPR}$ | Packet reordering rate from TWP. |
| Reverse | $\theta_r$ | Estimated available bandwidth from TWP. |
|  | $R_{RRPL}$ | Packet loss rate from RTP. |
|  | $R_{TRPL}$ | Packet loss rate from TWP. |
|  | $R_{RRPL2}$ | Loss pair rate from RTP. |

TABLE 1-continued

Detail packet loss metrics measured during one probe

| Direction | Metric | Defination |
|---|---|---|
|  | $R_{TRPL2}$ | Loss pair rate from TWP. |
|  | $R_{RRPR}$ | Packet reordering rate from RTP. |
|  | $R_{TRPR}$ | Packet reordering rate from TWP. |
| Round - trip | RTT | Round-trip time. |
|  | $J_{RTT}$ | Round-trip time variation (jitter). |
|  | $Fail_{RTP}$ | Connection failure rate in RTP. |
|  | $Fail_{TWP}$ | Connection failure rate in TWP. |

Figure 7A:
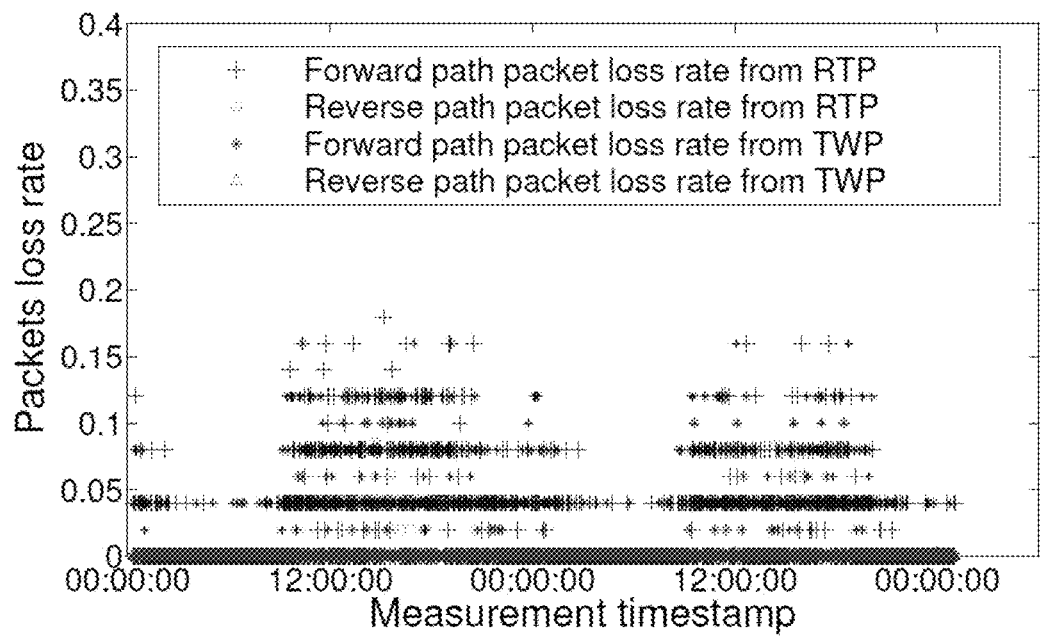
FIG. 7A illustrates a performance (i.e., packet loss rate) of a path from Japan to Hong Kong over 48 hours according to an embodiment of the present disclosure.

PathScope keeps collecting samples of one or more of these metrics and builds a normal profile (as a control or reference) for each path using the data in the absence of LFA. Since the measurement results show diurnal pattern, the inventors build the normal profile for each or several hours per day. For example, FIG. 7A shows the diurnal pattern of forward path packet loss rate and $\theta_e$ on a path from Japan to Hong Kong over 48 hours.

Then, PathScope uses the Mahalanobis distance to quantify the difference between the profile and a new round of measurement results as follows:

$$D_M(\vec{F}) = \sqrt{(\vec{F} - \vec{\lambda})^T \Omega^{-1} (\vec{F} - \vec{\lambda})}, \quad (6)$$

where $\vec{F}$ is the metric vectors from a round of measurement results which will be described below. $\vec{\lambda}$ denotes the mean metric vector in the profile and $\Omega$ is the covariance matrix.

$$\Omega = \frac{1}{n-1} \sum_{i=1}^{n} (\lambda_i - \overline{\lambda})(\lambda_i - \overline{\lambda})^T, \quad (7)$$

where $\lambda_i$ is the $i^{th}$ metric in the profile, n is the number of metrics and $$\overline{\lambda} = \frac{1}{n} \sum_{i=1}^{n} \lambda_i \quad (8)$$

Finally, PathScope employs the non-parametric CUSUM (Cumulative Sum) to capture the abrupt changes in the Mahalanobis distance (i.e., $D_M$). The non-parametric CUSUM algorithm assumes that the average distance is negative in normal situation and becomes positive when path is under attack. $D_n$ is used to denote the distance measured in $n^{th}$ probe and turn $\{D_n\}$ into a new sequence $\{X_n\}$ through $$X_n = D_n - \overline{D_n}, \quad (9)$$

$$\overline{D_n} = \text{mean}(D_n) + \alpha \text{std}(D_n), \quad (10)$$

where $\alpha$ is an adjustable parameter, mean($D_n$) is the mean value of $D_n$, and std($D_n$) is the stand deviation of $D_n$. The non-parametric CUSUM algorithm defines a new sequence $\{Y_n\}$ by Eq. (11).

$$Y_n = \begin{cases} (Y_{n-1} + X_n)^+, & n > 0 \\ 0, & n = 0 \end{cases} \text{ where } x^+ = \begin{cases} x, & x > 0 \\ 0, & \text{otherwise} \end{cases} \quad (11)$$

Since the Mahalanobis distance quantifies the difference between the profile and a new observation, a measurement result showing better network performance may also be regarded as anomalies. To remedy this problem, embodiments of the present disclosure only consider the alerts where the measured performance metrics become worse than the normal profile (e.g. smaller $\theta_e$, larger packet loss rate, etc.) because of the nature of LFA.

S(5). Locating the Target Link

Figure 8:
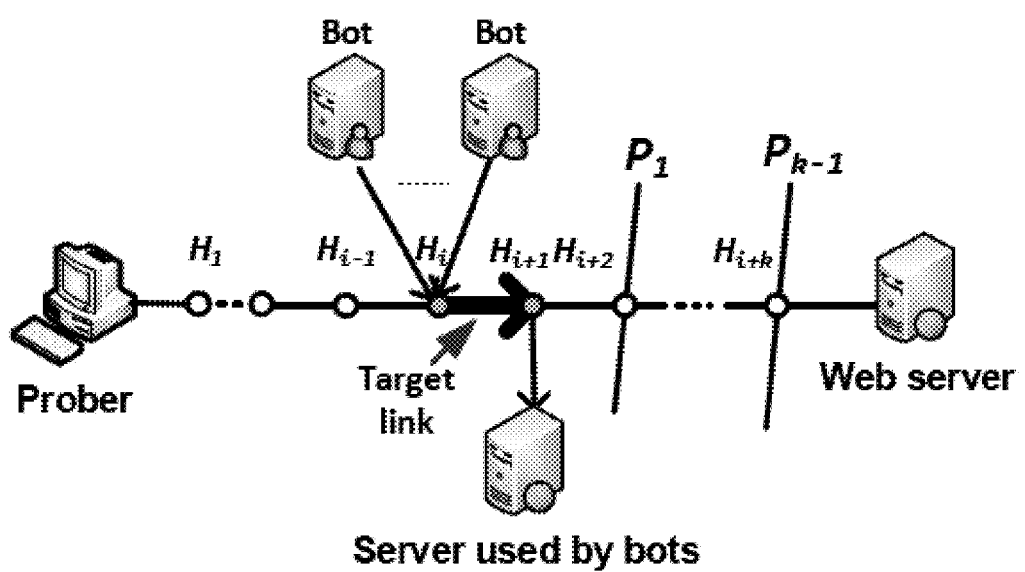
FIG. 8 illustrates a mechanism for locating a target link according to an embodiment of the present disclosure.

When performance anomaly is detected on a forward path, PathScope tries to locate the target link through two steps. An example shown in FIG. 8 is used to illustrate the steps, where bots send traffic to the server used by bots in order to congest the link between $H_i$ and $H_{i+1}$. First, based on the hop-by-hop measurement results from mRPT, PathScope knows that the path from $H_1$ to $H_{i-1}$ is not under attack. Second, according to the topology analysis, Path Scope will perform measurement on other paths that cover the hops after $H_i$, such as P1 going through $H_{i+1}$ and $P_{k-1}$ covering $H_{i+k}$. If one new path (e.g. the one covering $H_{i+j}$) does not have bad performance like the original path, then the target link is in the area from $H_i$ to $H_{i+k-1}$. The rational behind this approach comes from the nature of LFA that congests a selected link so that all paths including or overlapping with that link will suffer from similar performance degradation. By contrast, other paths will not have similar patterns. Since the paths identified in S(1) may not to cover all hops on the original path, in some examples the following steps are used to look for new paths.

1) For a hop, $H_k$, high-speed scanning tools such as Zmap are utilized to look for web servers in the same subnet as $H_k$, which can be determined through systems like traceNET. If a web server is found, PathScope does traceroute to this web server and checks whether the path to the server goes through $H_k$.

2) Look for web servers located in the same AS as $H_k$ and then check whether the paths to those web servers go through $H_k$.

3) Look for web servers located in the buddy prefix as $H_k$ and then check whether the paths to those web servers go through $H_k$.

4) If no such path can be found, next hop will be checked.

Figure 9:
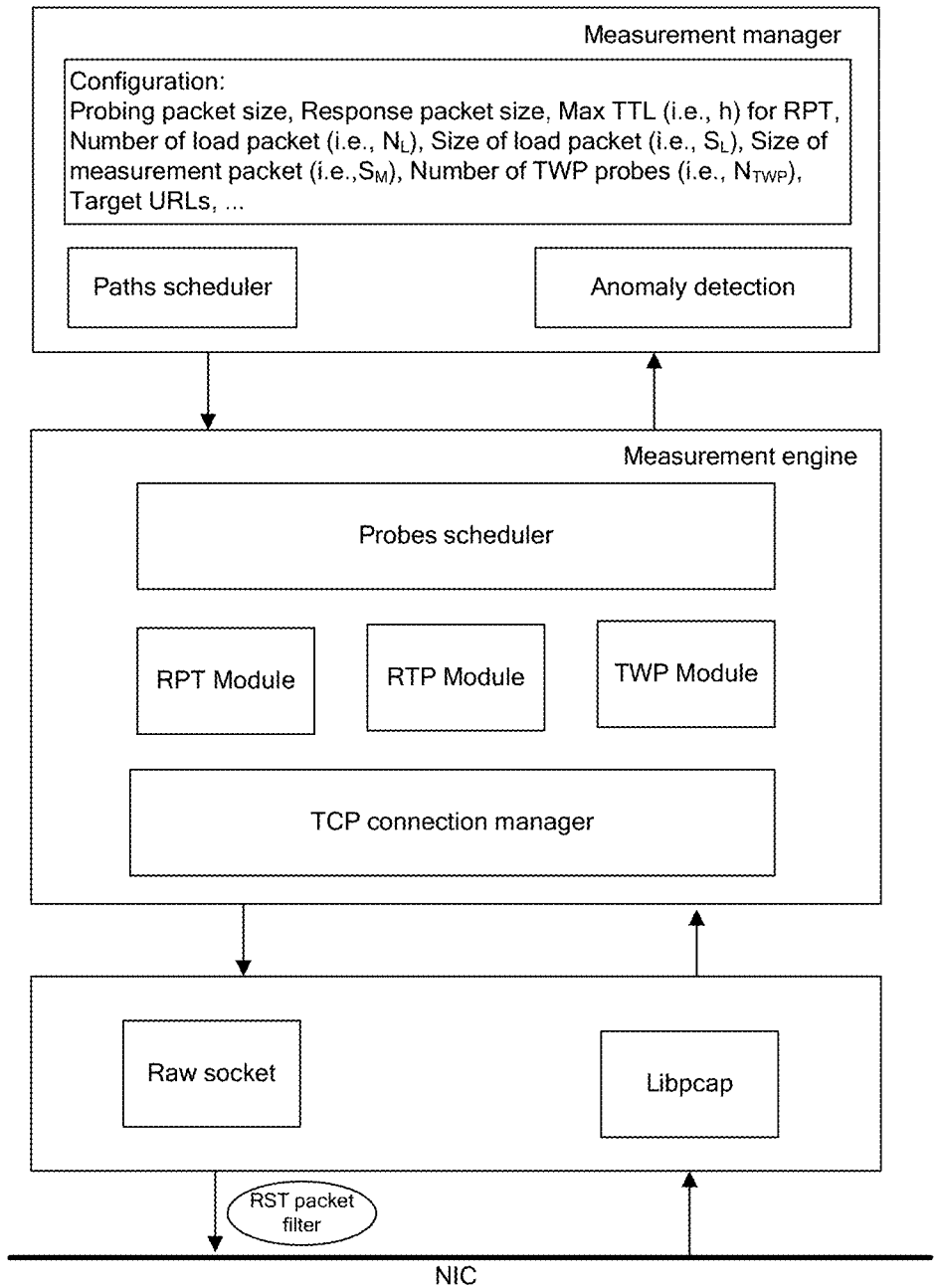
FIG. 9 illustrates the architecture of PathScope according to an embodiment of the present disclosure.

The following embodiment will detail the design of Path Scope whose architecture is illustrated in FIG. 9.

A. Measurement Manager

Since the original designs of RTP, TWP, and RPT are not limited to specific application layer protocol, in embodiments of the present disclosure HTTP is used as the driving protocol because of the tremendous number of web servers.

A tool named WebChecker is used to collect basic information about the path and the remote server. It runs Paris-traceroute to determine the number of hops between a prober and the server, and then set h so that the measurement packet in mRPT can reach the network perimeter of the server.

WebChecker also enumerates suitable web objects in a web server and output a set of URLs. It prefers in some examples to fetch static web objects (e.g., figure, pdf, etc.) starting from the front page of a web site and regards a web object as a suitable one if its size is not less than 10K bytes. Furthermore, WebChecker will check whether the web server supports TCP options, including MSS, Timestamp, and Selective Acknowledgment (SACK), and HTTP header options, including Range, etc. These options may simplify the process of PathScope and/or enhance its capability. For example, if the server supports MSS, PathScope can control the size of response packets. Supporting Timestamp and SACK can ease the detection of forward path packet loss.

The paths scheduler in PathScope manages a set of probing processes, each of which conducts the measurement for a path. To avoid self-induced congestion, the path scheduler will determine when the measurement for a certain path will be launched, how long a path will be measured, etc. In some examples, each path will be measured for 10 minutes. In some examples, the probing packet size, the response packet size, and the load packet size are set to 1500 bytes. The number of load packets is 20 and the size of measurement packet is 60 bytes in some examples. The number of RTP probes and the number of TWP probes are equal to 30 in some examples. All these parameters can be configured by a user.

The collected measurement results will be sent to the anomaly detection module for detecting LFA.

B. Measurement Engine

In the measurement engine, the probes scheduler manages the measurements on a path. A round of measurement consists of a probe based on the RPT pattern, $N_{RTP}$ probes based on the RTP pattern, and $N_{TWP}$ probes based on the TWP pattern (Note that in some embodiments it may be measured only some of these parameters). A probe consists of sending the probing packets and processing the response packets. After finishing a round of measurement, the probes scheduler will deliver the parsed measurement results to the anomaly detection module and schedule a new round of measurement.

The RPT, RTP, and TWP modules are in charge of preparing the probing packets and handling the response packets according to the corresponding patterns. Before conducting measurement based on mRPT, PathScope sets each measurement packet's IPID to its TTL. Since each pair of measurement packets will trigger two ICMP packets, PathScope inspects the ICMP packet's payload, which contains the IP header and the first 8 bytes of the original packet's data, to match it to the measurement packet.

In some examples, in each round of measurement for a path all probes are performed within one TCP connection. Such approach can mitigate the negative effect due to firewall and instable routes, because stateful firewall will drop packets that do not belong to any established TCP connection and load balancer will employ the five tuple of <src IP, src Port, dst IP, dst Port, Protocol> to select routes.

The TCP connections manager will establish and maintain TCP connections. In some examples, if the operating system (OS) supports netfilter/iptables, PathScope establishes TCP connections by itself without relying on the system's TCP/IP stack. Moreover, if the server in some examples supports TCP options like MSS, Timestamp, and SACK, the TCP connections manager will use MSS option to control the size of response packet (i.e., the server will use the minimal value between its MSS and the MSS announced by Path-Scope). It will also put the SACK-permitted option and TCP timestamp option into the TCP SYN packet sent from PathScope to the server.

In some examples, PathScope needs to control the establishment of TCP connections and customize probing packets (e.g., sequence number, acknowledgement number, advertising window, etc.), so all packets are sent through raw socket. Moreover, PathScope uses for example the libpcap library to capture all response packets.

C. RST Packet Filter

In embodiments of the present disclosure, PathScope constructs all packets by itself and sends them out through raw socket, OS does not know how to handle the response packets and therefore it will reply with an RST packet to the server to close the TCP connections. Two approaches can be employed to filter out RST packets generated by OS.

Figure 10A:
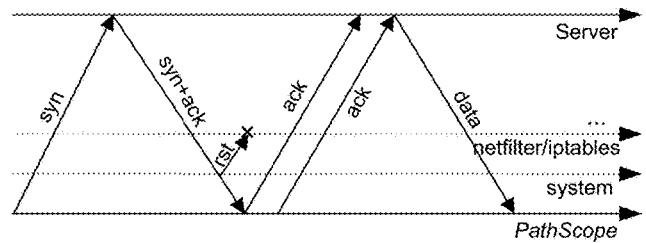
FIG. 10A illustrates a RST packet filter by using netfilter/iptables according to an embodiment of the present disclosure.

As shown in FIG. 10A, if the system supports netfilter/iptables, then it is used to drop all RST packets except those generated by PathScope. The RST packets from OS and that from PathScope can be differentiated through the IPID value in the IP header, since PathScope will set the IPID value of its RST packets to a special value.

Figure 10B:
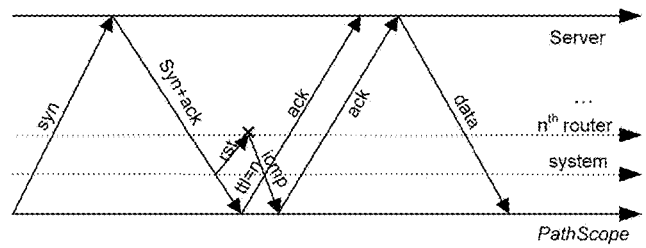
FIG. 10B illustrates another RST packet filter by modifying the TTL of the RST packet according to an embodiment of the present disclosure.

In some examples, some hosts do not support netfilter/iptables, such as those Planetlab nodes, it is proposed another method as shown in FIG. 10B. PathScope first establishes a TCP connection with the web server using stream socket (i.e., SOCK_STREAM), and then uses the function setsockopt to set the TTL value in each packet generated by OS to a small value so that it will not reach the web server. Moreover, PathScope utilizes the libpcap library to capture the TCP three-way handshaking packets generated by OS to record the initial sequence numbers selected by the local host and the web server along with other information related to the TCP connection, such as source port, TCP options, etc. After that, PathScope will create and send probing packets through raw socket with the help of such information.

Extensive experiments in a test-bed and the Internet have been carried out to evaluate PathScope's functionality and overhead. The results show that PathScope can quickly detect LFA with high accuracy and low false positive rate.

A. Test Bed

Figure 11:
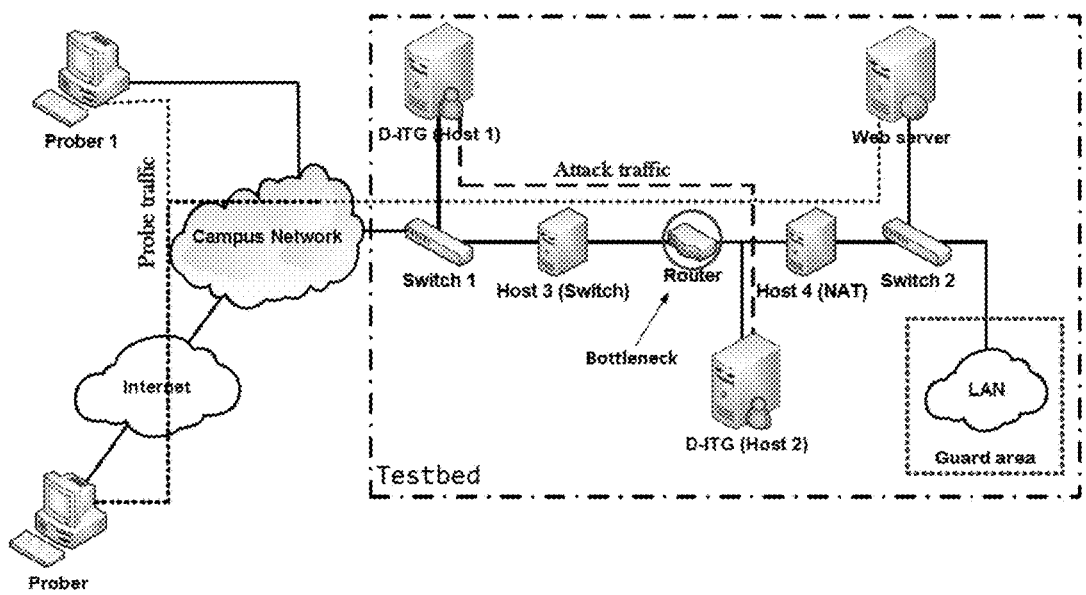
FIG. 11 illustrates the topology of the testbed according to an embodiment of the present disclosure.

FIG. 11 shows the topology of the test bed that connects to the Internet through the campus network. All hosts run Ubuntu system. Host 1 and Host 2 act as attackers and the public server used by attackers, respectively. They use D-ITG to generate traffic for congesting the MikroTik router in the circle. The router serves as the bottleneck with 10 Mbps bandwidth. Host 3 is a bridge for emulating packet loss and packet reordering and Host 4 is a NAT-enable router providing port forwarding in order to connect the web server and the LAN to the Internet. In the experiment, LAN denotes the guard area and the web server is a public server that can be accessed by nodes in the Internet. PathScope is deployed on Planetlab nodes and Amazon EC2 instances.

B. Emulated Attacks in the Test Bed

To demonstrate that PathScope can capture different kinds of LFA, we emulate four types of LFA in the testbed and use the abnormal changes in $\theta_e$ to illustrate the diverse effect due to different attacks. If the attacker floods the bottleneck with high-volume traffic, all TCP connections including the one for measurement are disconnected and $\theta_e$ becomes zero all the time.

Figure 12A:
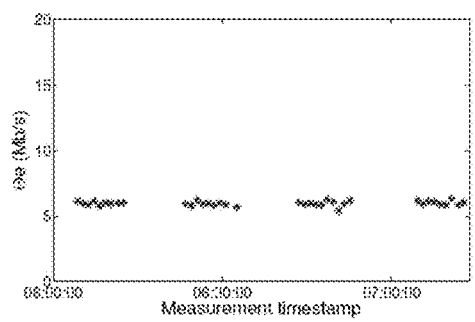
FIGS. 12A-12D illustrate available bandwidth measured with different attack from to Prober 1 to the test bed according to an embodiment of the present disclosure.

FIG. 12A shows $\theta_e$ under pulsing LFA where the attacker transmits high-volume bursts of traffic to congest the bottleneck. The attack traffic rate is 1600 packets per second and the packet size is uniformly distributed in the range of [600, 1400] bytes. In the absence of attack, $\theta_e$ is close to the available bandwidth. Under the attack, since the bottleneck is severely congested and all connections are broken, $\theta_e$ becomes zero.

Figure 12B:
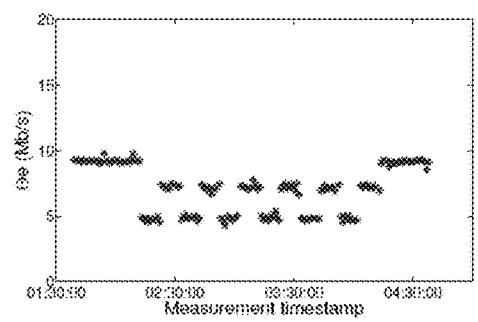

FIG. 12B illustrates $\theta_e$ under LFA with two attack traffic rates: 400 packets per second and 800 packets per second. An attacker may change the attack traffic rate for evading the detection. It can be seen that when the attack rate decreases (or increases), $\theta_e$ increases (or decreases), meaning that it can capture the changes in the attack traffic rate.

Figure 12C:
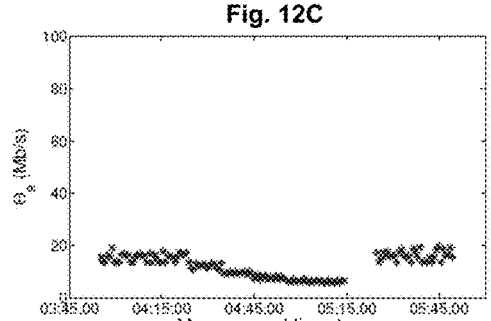

FIG. 12C represents $\theta_e$ under gradual LFA where the attack traffic rate increases from zero to a value larger than the capacity of the bottleneck. It emulates the scenario of DDoS attacks in Internet where the traffic sent from different bots may not reach the bottleneck simultaneously, thus showing the gradual increase in the attack traffic rate.

Although the TCP connection for measurement was broken when the attack traffic rate almost reaches its maximal value, the decreasing trend of $\theta_e$ can be employed to raise an early alarm.

Figure 12D:
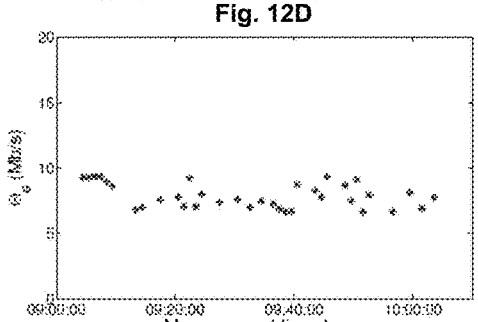

FIG. 12D demonstrates $\theta_e$ when a network element randomly drops packets. It may be due to occasional congestions or the use of random early drop (RED) in routers. It can be seen that although $\theta_e$ varies its values are still close to the available bandwidth.

Since LFA will cause severe intermittent congestion in selected links in order to cut off the Internet connections of the guard area, FIGS. 12A-12D demonstrate that we can use different patterns in performance metrics to distinguish it from other scenarios, such as long-term flooding and cable cut which will disable the Internet connection for quite a long period of time, and even identify different types of attacks.

C. Internet Probing

To evaluate the capability and the stability of PathScope, we run it on Planetlab nodes to measure paths to Hong Kong for two days and paths to Taiwan for seven days.

Figure 13A:
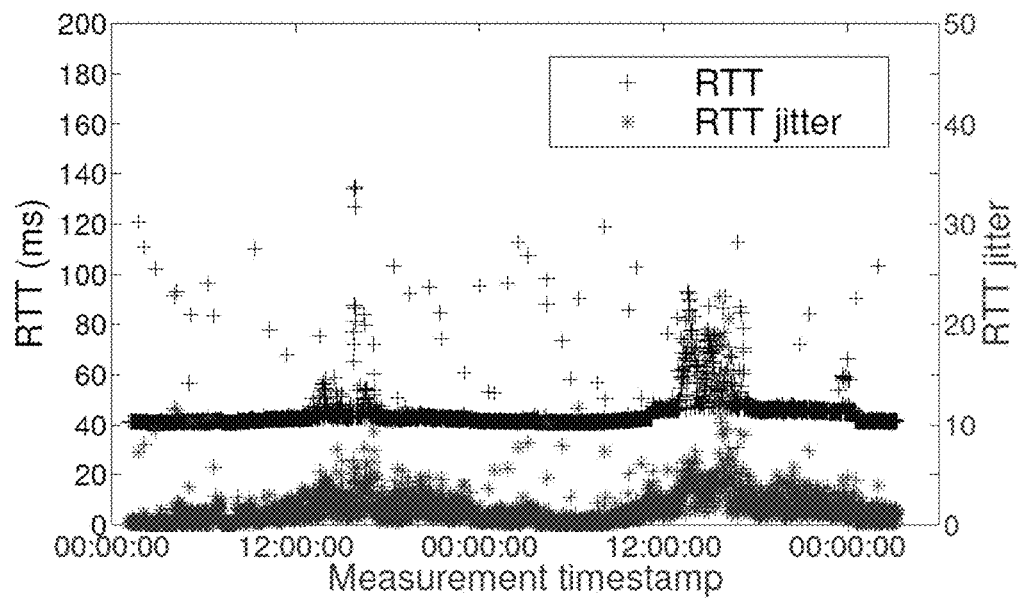
FIGS. 13A-13D illustrate performance metrics measured on a path from Amsterdam to Hong Kong for two days according to an embodiment of the present disclosure.
Figure 13B:
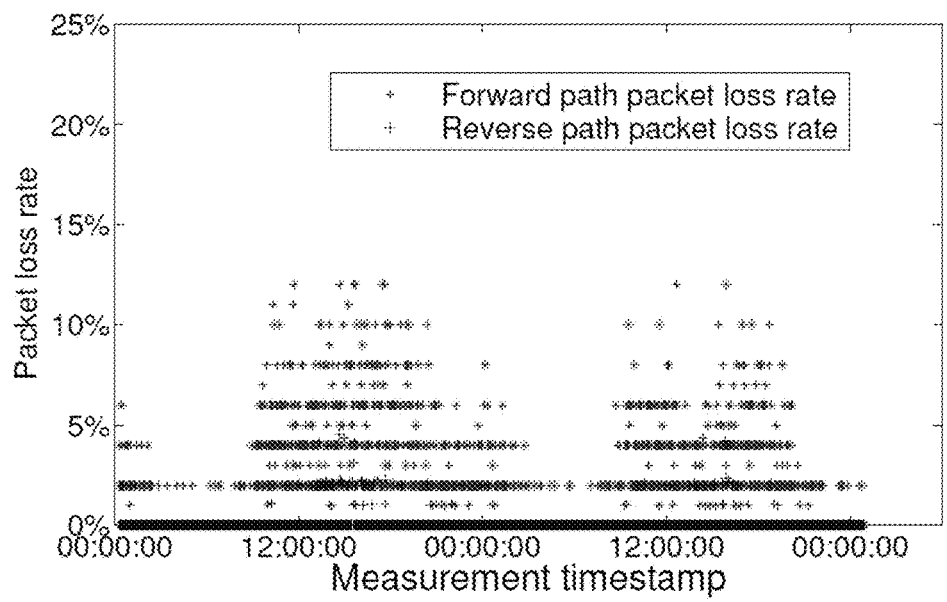
Figure 13C:
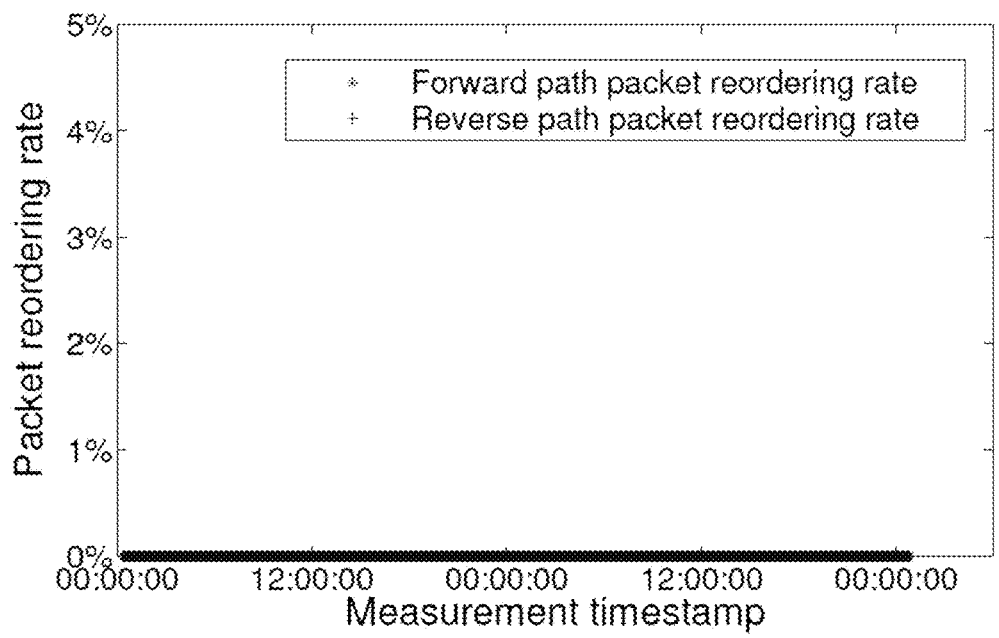
Figure 13D:
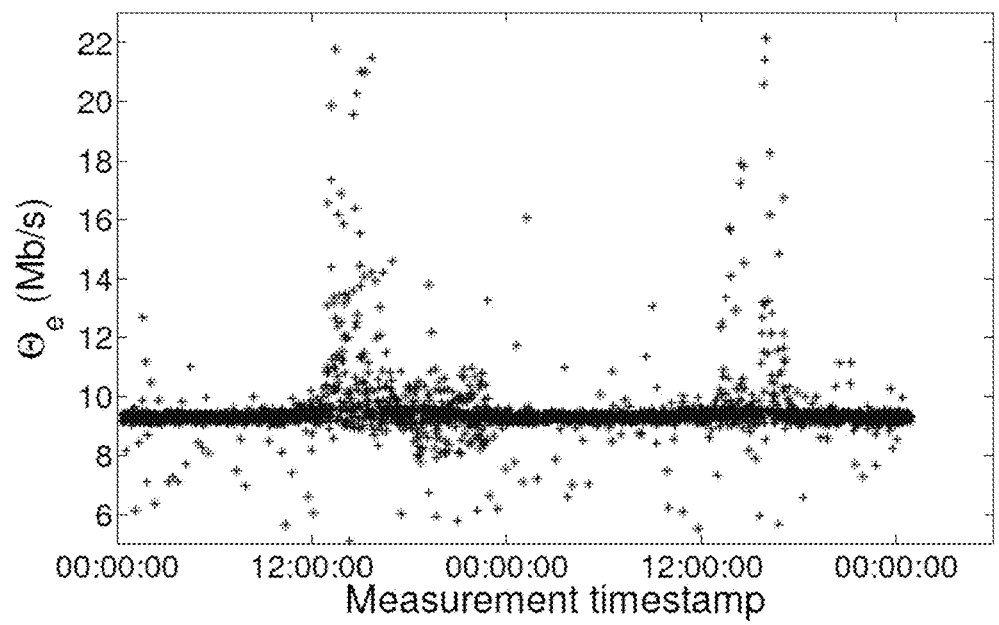
Figure 14:
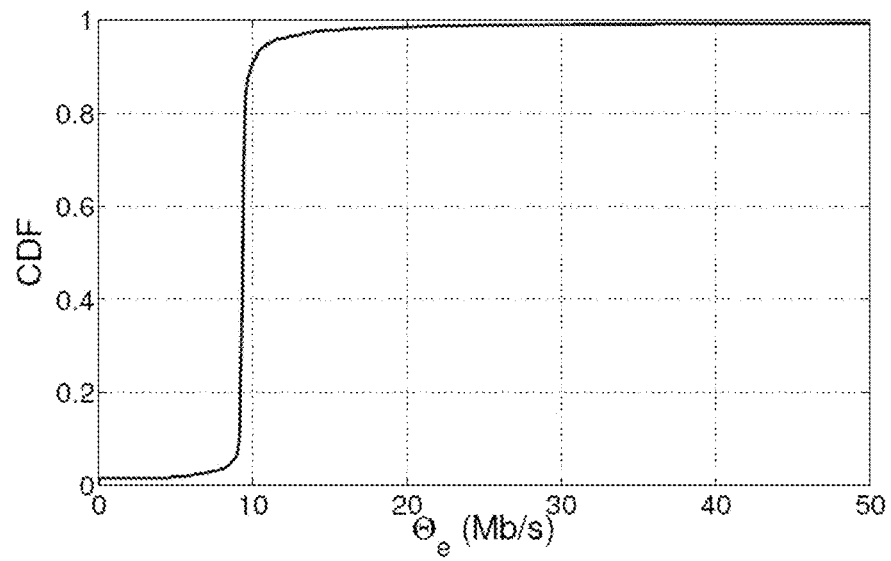
FIG. 14 illustrates CDF of $\theta_e$ on the path from Amsterdam to Hong Kong according to an embodiment of the present disclosure.

FIGS. 13A-13D show the performance metrics measured on the path from Amsterdam to Hong Kong for two days. It demonstrates the diurnal patterns in forward path/reverse path packet loss, RTT, and jitter. The path performance is better and more stable in the period from 00:00 to 12:00 than that during the period from 12:00 to 24:00. The increased loss rate may affect the measurement of $\theta_e$ as some measurement results deviate during the period from 12:00 to 24:00 as shown in FIG. 13D. FIG. 14 illustrates the CDF of $\theta_e$ on the path from Amsterdam to Hong Kong, where $\theta_e$ concentrates on 9 Mb/s.

Figure 15A:
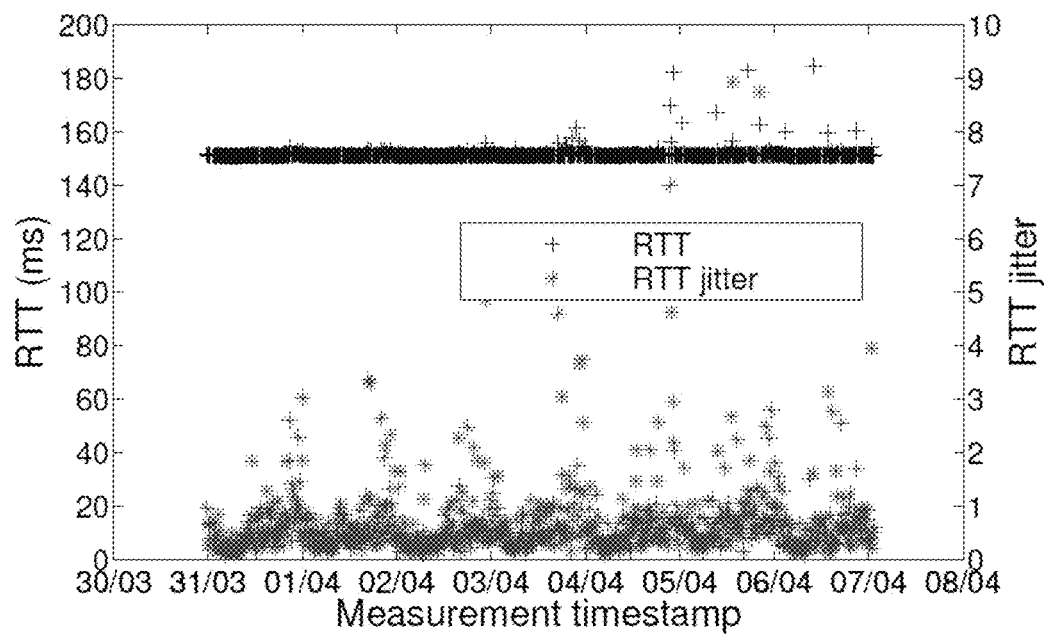
FIGS. 15A-15D illustrate performance metrics measured on a path from Santa Barbara to Taipei for seven days according to an embodiment of the present disclosure.
Figure 15B:
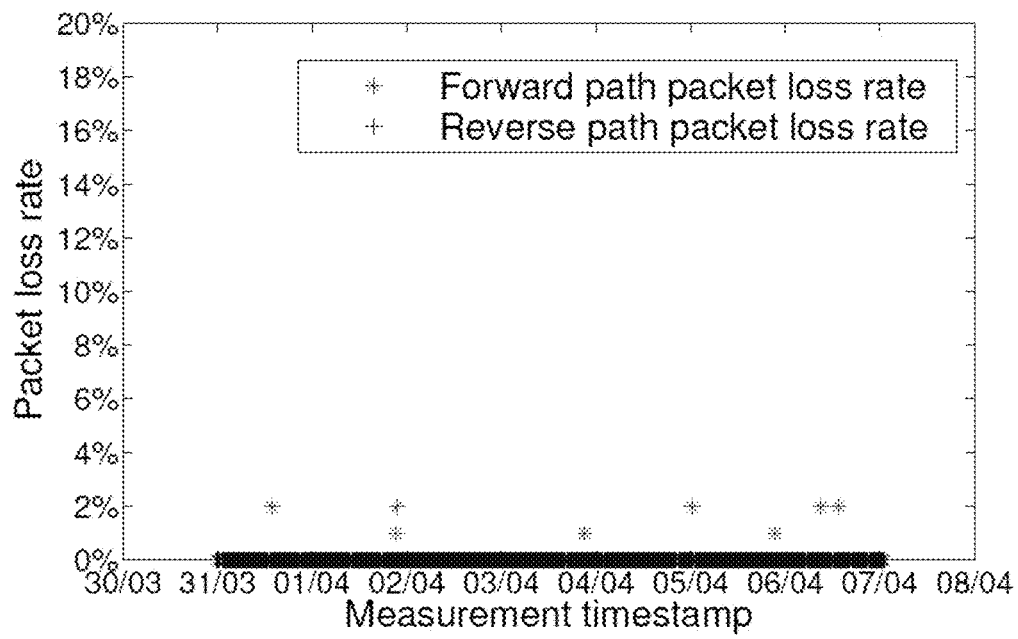
Figure 15C:
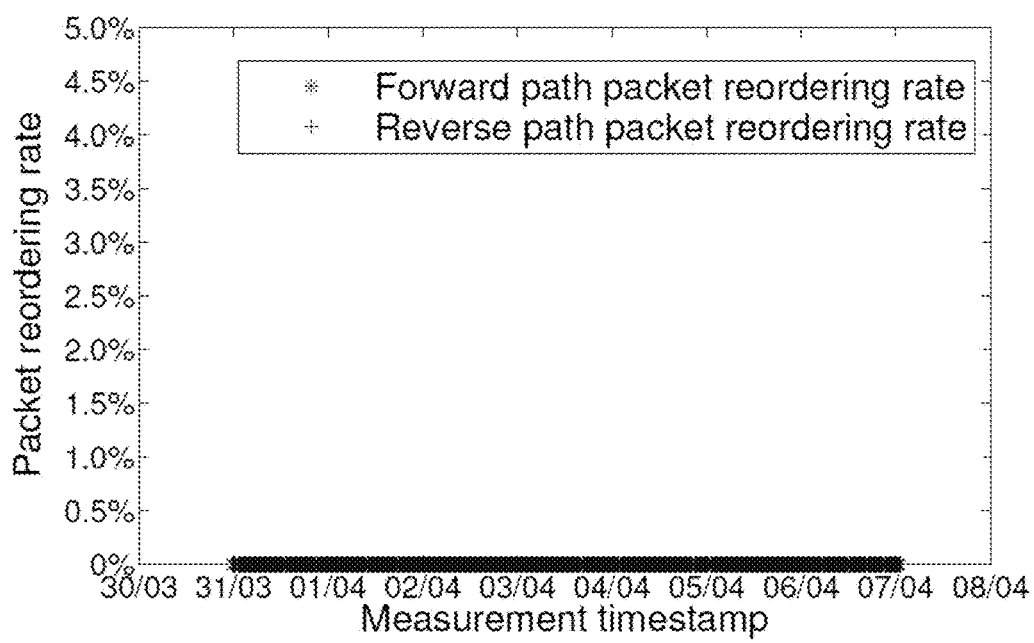
Figure 15D:
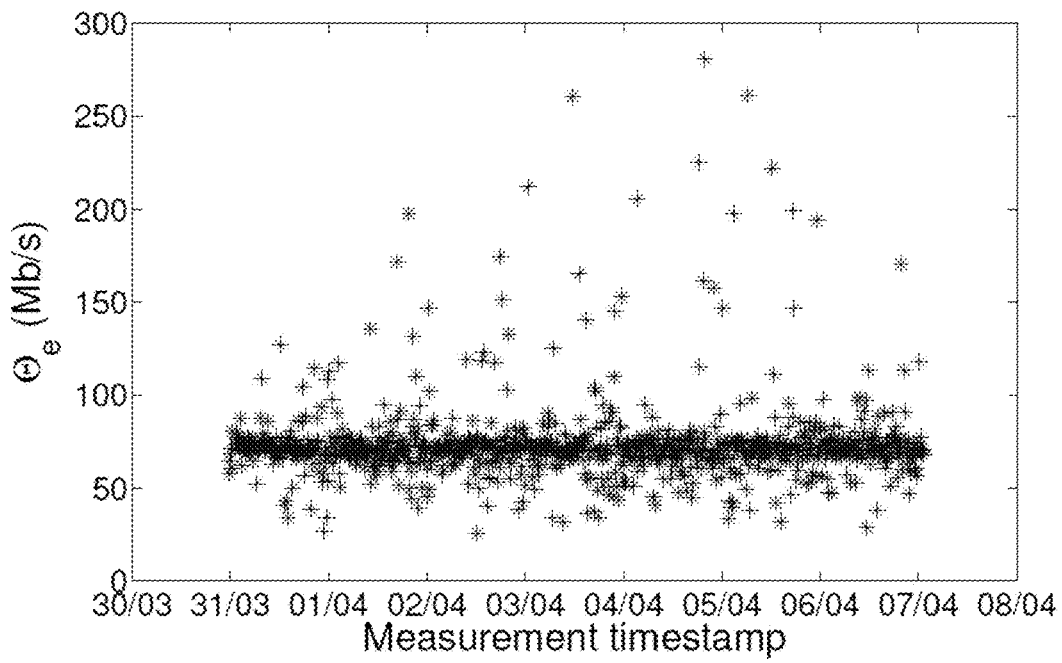
Figure 16:
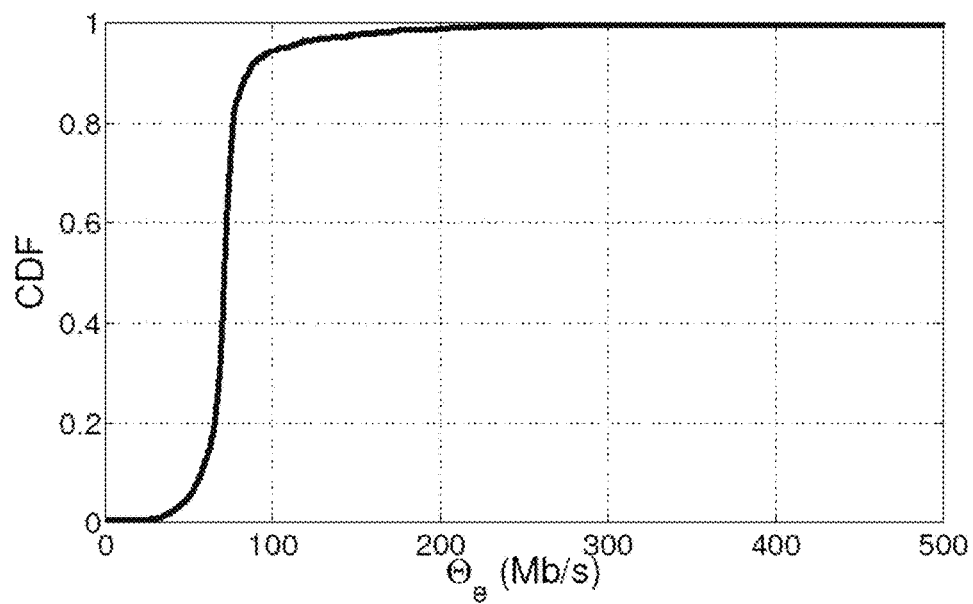
FIG. 16 illustrates CDF of $\theta_e$ on the path from Santa Barbara to Taipei according to an embodiment of the present disclosure.

FIGS. 15A-15D demonstrate the performance metrics measured on the path from Santa Barbara (US) to Taipei for seven days. This path has stable good performance. For example, RTT is around 150 ms and the jitter is less than 10 shown FIG. 15A. The loss rate is less than 2% and there is no packet reordering. The estimated end-to-end $\theta_e$ is around 75 Mbps as illustrated in FIG. 15D and FIG. 16. Since LFA will cause severe congestion during a short duration, it will cause obvious abrupt changes in the performance metrics and get caught by PathScope.

D. Detection Performance

It is first evaluated PathScope's false positive rate using Internet measurement results on different paths, and then assess its detection rate using emulated attacks in the test bed.

Figure 7B:
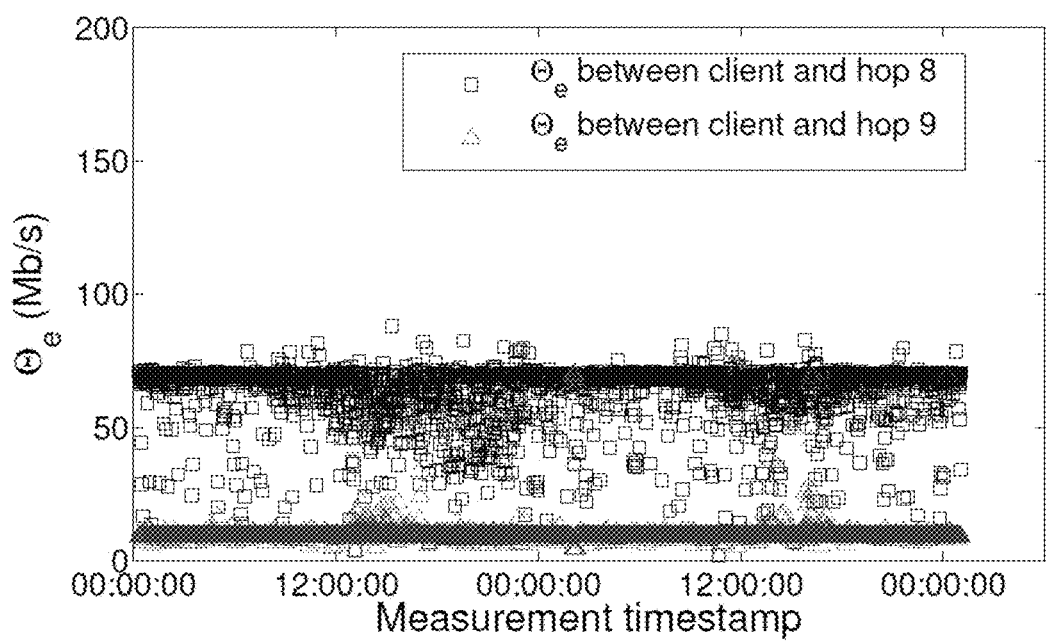
FIG. 7B illustrates a performance (i.e., $\theta_e$) of a path from Japan to Hong Kong over 48 hours according to an embodiment of the present disclosure.

On the paths to Hong Kong Path Scope conducts measurement once per minute for two days (48 hours). Besides the one-day data (24 hours) is divided into 24 sets (one set one hour), because features are changing over time shown in FIG. 7. The data obtained in the first day (24 hours) are used for training and the data in the second day (24 hours) are used for detection, the data obtained in the first day are used as the training data and the remaining data are used to evaluate PathScope's false positive rate. Table 2 lists the false positive rates on five paths to Hong Kong with different $\alpha$. The to first three probers are Amazon EC2 VM and the last two are Planetlab nodes. In this experiment, one-day data are divided equally into 24 segments. The false positive rates are all less than 10% and it decreases when $\alpha$ increases, because $\alpha$ serves as a threshold and a larger $\alpha$ may cover more normal scenarios. Table 2 shows that all false positive rates are smaller than 6% when $\alpha$ is not less than 30.

TABLE 2

False positive rate on paths to Hong Kong

| Prober type | Path | $\alpha = 10$ | $\alpha = 20$ | $\alpha = 30$ | $\alpha = 40$ | $\alpha = 50$ |
|---|---|---|---|---|---|---|
| $EC^2$ | Virginia-Hong Kong | 6.32% | 5.99% | 5.12% | 4.33% | 3.67% |
| $EC^2$ | Tokyo-Hong Kong | 5.88% | 4.02% | 2.85% | 2.07% | 1.94% |
| $EC^2$ | Ireland-Hong Kong | 8.69% | 7.24% | 5.75% | 5.23% | 4.58% |
| PL node | Amsterdam-Hong Kong | 4.18% | 2.61% | 1.69% | 1.30% | 0.91% |
| PL node | Beijing-Hong Kong | 3.54% | 2.96% | 2.06% | 2.67% | 1.28% |

Table 3 shows false positive rate on the paths from five Planetlab nodes to Taiwan. On these paths, Pathscope conducts measurement once per ten minutes for seven days. The data in the first day are taken as the training data and the remaining data for evaluation. Table 3 shows that the increases of $\alpha$ can decrease the false positive rate.

TABLE 3

False positive rate on paths to Taiwan with different configures

| Prober type | Path | $\alpha = 20$ | $\alpha = 30$ | $\alpha = 40$ |
|---|---|---|---|---|
| PL node | Boston - Taipei | 2.17% | 1.45% | 0.97% |
| PL node | Urbana - Taipei | 2.18% | 1.69% | 1.45% |
| PL node | Turkey - Taipei | 2.20% | 2.19% | 1.21% |
| PL node | Tokyo - Taipei | 1.59% | 3.17% | 3.17% |
| PL node | Blacksburg - Taipei | 1.76% | 1.25% | 1.00% |

By inspecting false positive cases, it is found that almost all the false positives are due to connection failure. It may happen even without attack. Take the path from Tokyo to Hong Kong as an example, the connection failure rate in two days is 4.06%. This rate varies over time, such as, 0.90% during the period from 00:00 to 12:00 and 7.5% for the period from 12:00-24:00, because the network performance is much more unstable from 12:00 to 00:00 (such as shown in FIGS. 13A-13D). However, in the absence of LFA, the connection failures scatter over time while the connection failures appear continuously in the presence of LFA.

To evaluate PathScope's detection rate, we emulate different attacks between Host 1 and Host 2 as shown FIG. 11. During the pulsing LFA and gradual LFA, the detection rate is always 100%. Because when the attack traffic rate is much higher than the available bandwidth, the path is congested and none response packets can be received from the destination all the time. Table 4 lists the detection rates when the attack traffic rate is a little higher than the bandwidth (1.2 times of bandwidth). In this case, PathScope can still receive some response packets and compute the measurement results. Table 4 shows that the anomaly detection rates are still 100% though the attacks cannot fully clog the bottleneck.

TABLE 4

Detection rate

| Training data | path | $\alpha = 10$ | $\alpha = 20$ | $\alpha = 30$ |
|---|---|---|---|---|
| 20 probes | path 1 | 100.0% | 100.0% | 100.0% |
| 20 probes | path 2 | 100.0% | 100.0% | 100.0% |

TABLE 4-continued

Detection rate

| Training data | path | α = 10 | α = 20 | α = 30 |
|---|---|---|---|---|
| 40 probes | path 1 | 100.0% | 100.0% | 100.0% |
| 40 probes | path 2 | 100.0% | 100.0% | 100.0% |

E. System Load

To evaluate the system load introduced by PathScope, htop is used to measure the client's and web server's average load and average CPU utilization when PathScope runs with different configurations. The client, running Ubuntu 12.04 LTS system, is equipped with Intel 3.4 GHz i7-4770 CPU, 16G memory, and 1 Gbps NIC, and the web server is equipped with Intel 2.83 GHz Core™2 Quad CPU and runs Ubuntu 12.04 LTS system and Apache2.

Table 5 lists the results for both the client and the server. The first line represents to the load and CPU utilization without PathScope and it is ensured that no other routine processes are executed on both machines during the measurement. It can be seen that even when there are 100 probing process with 10 Hz measurement rates, the average loads and average CPU utilizations are still very low on both machines, especially for the web server.

TABLE 5

The CPU utilizations and load average in the probing client and web server during measurement

| | | Probing client | | Web sever | |
|---|---|---|---|---|---|
| Probing processes | Measurement rate (Hz) | Load average | CPU utilization | Load average | CPU utilization |
| 0 | 0 | 0.01 | 0.3% | 0.00 | 0.5% |
| 1 | 2 | 0.06 | 0.3% | 0.00 | 0.5% |
| 1 | 10 | 0.10 | 0.3% | 0.01 | 0.6% |
| 2 | 10 | 0.10 | 0.4% | 0.01 | 0.6% |
| 10 | 10 | 0.11 | 1.7% | 0.02 | 0.7% |
| 50 | 10 | 0.23 | 2.4% | 0.08 | 0.8% |
| 100 | 10 | 0.47 | 2.7% | 0.09 | 0.8% |

The following describes the comparison between some network anomaly detection methods and PathScope of the present disclosure.

Network anomaly detection can be roughly divided into two categories: performance related anomalies and security related anomalies. The performance related anomalies include transient congestion, file sever failure, broadcast storms and so on, and security related network anomalies are often due to DDoS (Distributed Denial of Service) attacks that flood the network to prevent legitimate users from accessing the services. PathScope employs various performance metrics to detect a new class of target link flooding attacks (LFA).

Anomaly detection attempts to find patterns in data or performance, which do not conform to expected normal behavior. However, LFA can evade such detection because an attacker instructs bots to use legitimate traffic to congest select links and the attack traffic will never reach the victim's security detection system. In stead of passively inspecting traffic for discovering anomalies, PathScope conducts non-cooperative active measurement to cover as many paths as possible and captures the negative effect of LFA on performance metrics.

Although active network measurement has been employed to detect network faults and connectivity problems, they cannot be directly used to detect and locate LFA because of two major reasons. First, since LFA will cause temporal instead of persistent congestions, existing systems that assume persistent connection problems cannot be used. Second, since LFA avoids causing BGP changes, previous techniques that rely on route changes cannot be employed. Moreover, the majority of active network measurement systems require installing software on both ends of a network path. PathScope is the first system that can conduct both the end-to-end and the hop-by-hop non-cooperative measurement, and take into account the anomalies caused by LFA.

Router-based approaches have been proposed to defend against LFA and other smart DDoS attacks, their effectiveness may be limited because they cannot be widely deployed to the Internet immediately. By contrast, PathScope can be easily deployed because it conducts non-cooperative measurement that only requires installation one end of a network path. PathScope can be used along with traffic engineering tools to mitigate the effect of LFA.

Existing network tomography techniques cannot be applied to locate the target link, because they have many impractical assumptions (e.g., multicast, source routing). Although binary tomography may be used for identifying faulty network links, it just provides coarse information and they are not suitable for locating the link targeted by LFA, because they adopt assumptions for network fault (e.g., there is only one highly congested link in one path, faulty links are nearest to the source). LFA can easily invalid them. Moreover, the probers in network tomography create a measurement mesh network, whereas in scenarios of the present disclosure there is only one or a few probers and probers may not communicate with each other.

When implemented in form of a software functional module and sold or used as an independent product, a module/unit of an embodiment of the present disclosure may also be stored in a non-transitory computer-readable storage medium. Based on such an understanding, the essential part or a part of the technical solution of an embodiment of the present disclosure contributing to prior art may appear in form of a software product, which software product is stored in storage media, and includes a number of instructions for allowing a computer equipment (such as a personal computer, a server, a network equipment, or the like) to execute all or part of the methods in various embodiments of the present disclosure. The storage media include various media that can store program codes, such as a U disk, a mobile hard disk, a Read-Only Memory (ROM), a magnetic disk, a CD, and the like. Thus, an embodiment of the present disclosure is not limited to any specific combination of hardware and software.

Accordingly, an embodiment of the present disclosure further provides a non-transitory computer storage medium storing instructions (which may be executed by for example a processing circuit or a processor) thereon for executing any network attack detection method according to any embodiment of the present disclosure.

Also, as used herein a processor corresponds to any electronic device that is configured via hardware circuits, software, and/or firmware to process data. For example, processors described herein may correspond to one or more (or a combination) of a CPU, FPGA, ASIC, or any other integrated circuit (IC) or other type of circuit that is capable of processing data in a controller, computer, server, mobile phone, and/or any other type of electronic device.

Reference throughout this specification to "one embodiment," "an embodiment," "specific embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in a specific embodiment," or the like in the singular or plural in various places throughout this specification are not necessarily all referring to the same embodiment. Furthermore, the particular features, structures, or characteristics may be combined in any suitable manner in one or more embodiments.

The terminology used in the description of the disclosure herein is for the purpose of describing particular examples only and is not intended to be limiting of the disclosure. As used in the description of the disclosure and the appended claims, the singular forms "a," "an," and "the" are intended to include the plural forms as well, unless the context clearly indicates otherwise. Also, as used in the description herein and throughout the claims that follow, the meaning of "in" includes "in" and "on" unless the context clearly dictates otherwise. It will also be understood that the term "and/or" as used herein refers to and encompasses any and all possible combinations of one or more of the associated listed items. It will be further understood that the terms "may include," "including," "comprises," and/or "comprising," when used in this specification, specify the presence of stated features, operations, elements, and/or components, but do not preclude the presence or addition of one or more other features, operations, elements, components, and/or groups thereof.

While the foregoing disclosure discusses illustrative aspects and/or embodiments, it should be noted that various changes and modifications could be made herein without departing from the scope of the described aspects and/or embodiments as defined by the appended claims.

The invention claimed is:

1. A method, comprising:
at an electronic device having one or more processors, and a memory for storing program instructions that are executed by the one or more processors,
conducting a topology analysis on network, and obtaining a probing path set containing at least one probing path according to the topology analysis;
probing a first probing path contained in the probing path set by using a probing pattern and obtaining a performance metric of the first probing path; and
determining whether the first probing path is subjected to network attack according to the performance metric and a control performance metric,
wherein one end of the probing path is a probing node and another end of the probing path is a target node, a forward path of the probing path is from the probing node to the target node and a reverse path of the probing path is from the target node to the probing node,
wherein the probing pattern is Round Trip Probing (RTP),
wherein the probing a first probing path by using a probing pattern and obtaining a performance metric of the first probing path comprises:
sending at least two RTP probing packets from the probing node to the target node;
receiving RTP response packets in responsive to the RTP probing packets from the target node of the first probing path, each RTP response packet having a sequence number and an ACK number; and
according to the sequence numbers and the ACK numbers of the RTP response packets, determining one or more of the following performance metric of the first probing path: a RTP packet loss rate on the forward path, a RTP loss pair rate on the forward path, a RTP packet reordering rate on the forward path, a RTP packet loss rate on the reverse path, a RTP packet reordering rate on the reverse path, and a RTP loss pair rate on the reverse path,
wherein a packet pair on the forward path is placed between load packets and measurement packets and consists of an $\alpha^{th}$ RTP probing packet and an $\alpha+1^{th}$ RTP probing packet, a packet pair on the reverse path consists of an $\alpha^{th}$ RTP response packet and an $\alpha+1^{th}$ RTP response packet, the $\alpha^{th}$ RTP probing packet corresponds to the $\alpha^{th}$ RTP response packet, a time gap between the $\alpha^{th}$ RTP response packet and the $\alpha+1^{th}$ RTP response packet being used to estimate an interval between head and tail load packets.

2. The method according to claim 1, wherein the performance metric further comprises Round Trip Time (RTT) and/or RTT jitter,
wherein the RTT is determined according to a sending time of a RTP probing packet and an arrival time of a corresponding RTP response packet,
wherein the RTT jitter is determined according to multiple RTTs.

3. The method according to claims 1, wherein the electronic device comprises an electronic device conducting the topology analysis at only one end of an Internet path.

4. A non-transitory computer-readable storage medium storing instructions thereon for execution by at least one processing circuit, the instructions comprising:
conducting a topology analysis on network, and obtaining a probing path set containing at least one probing path according to the topology analysis;
probing a first probing path contained in the probing path set by using a probing pattern and obtaining a performance metric of the first probing path; and
determining whether the first probing path is subjected to network attack according to the performance metric and a control performance metric,
wherein one end of the probing path is a probing node and another end of the probing path is a target node, a forward path of the probing path is from the probing node to the target node and a reverse path of the probing path is from the target node to the probing node,.
wherein the probing pattern is Round Trip Probing (RTP),
wherein the probing a first probing path by using a probing pattern and obtaining a performance metric of the first probing path comprises:
sending at least two RTP probing packets from the probing node to the target node;
receiving RTP response packets in responsive to the RTP probing packets from the target node of the first probing path, each RTP response packet having a sequence number and an ACK number; and
according to the sequence numbers and the ACK numbers of the RTP response packets, determining one or more of the following performance metric of the first probing path: a RTP packet loss rate on the forward path, a RTP loss pair rate on the forward path, a RTP packet reordering rate on the forward path, a RTP packet loss rate on the reverse path, a RTP packet reordering rate on the reverse path, and a RTP loss pair rate on the reverse path,
wherein a packet pair on the forward path is placed between load packets and measurement packets and consists of an $\alpha^{th}$ RTP probing packet and an $\alpha+1^{th}$ RTP probing packet, a packet pair on the reverse path consists of an $\alpha^{th}$ RTP response packet and an $\alpha+1^{th}$ RTP response packet, the $\alpha^{th}$ RTP probing packet corresponds to the $\alpha^{th}$ RTP response packet, a time gap between the $\alpha^{th}$ RTP response packet and the $\alpha+1^{h}$ RTP response packet being used to estimate an interval between head and tail load packets.

5. The non-transitory computer-readable storage medium according to claim 4, wherein the topology analysis is performed at only one end of an Internet path.

6. An apparatus, comprising:
one or more processors; and
a memory coupled to the one or more processors;
instructions stored in the memory, the instructions being executable by the one or more processors to:
 conduct a topology analysis on network, and obtain a probing path set containing at least one probing path according to the topology analysis;
 probe a first probing path contained in the probing path set by using a probing pattern and obtain a performance metric of the first probing path; and
 determine whether the first probing path is subjected to network attack according to the performance metric and a control performance metric,
 wherein one end of the probing path is a probing node and another end of the probing path is a target node, a forward path of the probing path is from the probing node to the target node and a reverse path of the probing path is from the target node to the probing node,
 wherein the probing pattern is Round Trip Probing (RTP),
 wherein the probing a first probing path by using a probing pattern and obtaining a performance metric of the first probing path comprises:
 sending at least two RTP probing packets from the probing node to the target node;
 receiving RTP response packets in responsive to the RTP probing packets from the target node of the first probing path, each RTP response packet having a sequence number and an ACK number; and
 according to the sequence numbers and the ACK numbers of the RTP response packets, determining one or more of the following performance metric of the first probing path: a RTP packet loss rate on the forward path, a RTP loss pair rate on the forward path, a RTP packet reordering rate on the forward path, a RTP packet loss rate on the reverse path, a RTP packet reordering rate on the reverse path, and a RTP loss pair rate on the reverse path,
 wherein a packet pair on the forward path is placed between load packets and measurement packets and consists of an $\alpha^{th}$ RTP probing packet and an $\alpha+1^{th}$ RTP probing packet, a packet pair on the reverse path consists of an $a^{th}$ RTP response packet and an $\alpha+1^{th}$ RTP response packet, the $\alpha^{th}$ RTP probing packet corresponds to the $\alpha^{th}$ RTP response packet, a time gap between the $\alpha^{th}$ RTP response packet and the $\alpha+1^{th}$ RTP response packet being used to estimate an interval between head and tail load packets.

7. The apparatus according to claim 6, wherein the apparatus is located at only one end of an Internet path.

* * * * *